US011558627B2

(12) United States Patent
He et al.

(10) Patent No.: US 11,558,627 B2
(45) Date of Patent: Jan. 17, 2023

(54) PALETTE CODING FOR SCREEN CONTENT CODING

(71) Applicant: VID SCALE, INC., Wilmington, DE (US)

(72) Inventors: Yuwen He, San Diego, CA (US); Xiaoyu Xiu, San Diego, CA (US); Yan Ye, San Diego, CA (US); Ralph Neff, San Diego, CA (US)

(73) Assignee: VID Scale, Inc., Wilmington, DE (US)

( * ) Notice: Subject to any disclaimer, the term of this patent is extended or adjusted under 35 U.S.C. 154(b) by 553 days.

(21) Appl. No.: 16/258,829

(22) Filed: Jan. 28, 2019

(65) Prior Publication Data

US 2019/0158854 A1 May 23, 2019

Related U.S. Application Data

(63) Continuation of application No. 14/875,735, filed on Oct. 6, 2015, now abandoned.
(Continued)

(51) Int. Cl.
*H04N 19/186* (2014.01)
*H04N 19/182* (2014.01)
(Continued)

(52) U.S. Cl.
CPC ......... *H04N 19/186* (2014.11); *H04N 19/136* (2014.11); *H04N 19/146* (2014.11);
(Continued)

(58) Field of Classification Search
CPC ............... H04N 19/186; H04N 19/136; H04N 19/146; H04N 19/176; H04N 19/182;
(Continued)

(56) References Cited

U.S. PATENT DOCUMENTS 7,511,718 B2   3/2009 Subramanian et al.
8,953,690 B2   2/2015 Lou et al.
9,544,607 B2*  1/2017 Lai ...................... H04N 19/186
(Continued)

FOREIGN PATENT DOCUMENTS

CN    1989543 A    6/2007
CN  103891280 A    6/2014
(Continued)

OTHER PUBLICATIONS

Joshi et al., "Working Draft 1 of HEVC Screen Content Coding", JCT-VC, ISO/IEC/JTC1/SC29/WG11/N 14702, Sapporo, JP, Jul. 2014, 360 pages.
(Continued)

*Primary Examiner* — Sath V Perungavoor
*Assistant Examiner* — Kristin Dobbs
(74) *Attorney, Agent, or Firm* — Condo Roccia Koptiw LLP

(57) ABSTRACT

Sketch copy mode may be used to code blocks comprising irregular lines, syntax redundancy may be removed from blocks with special characteristics, and/or run value coding may be simplified. The parsing dependencies in palette coding design may be removed. For example, the context modeling dependency of the syntax element palette_transpose_flag may be removed, for example, by simplifying the corresponding context model. The context modeling of the syntax element palette_mode may be removed, for example, by using run-length coding without using context. The syntax parsing dependencies and/or the syntax signaling dependencies that are related with escape color signaling may be removed. A palette table generation process may handle input screen content video with high bit depths, for example, at the encoder side.

22 Claims, 23 Drawing Sheets

Pixel Positions coded in Run Mode
 Pixel Positions coded in Copy Mode
 Pixel Positions not yet coded

Related U.S. Application Data

(60) Provisional application No. 62/120,293, filed on Feb. 24, 2015, provisional application No. 62/060,536, filed on Oct. 6, 2014.

(51) Int. Cl.
| | | |
|---|---|---|
| *H04N 19/146* | (2014.01) | |
| *H04N 19/44* | (2014.01) | |
| *H04N 19/91* | (2014.01) | |
| *H04N 19/176* | (2014.01) | |
| *H04N 19/70* | (2014.01) | |
| *H04N 19/136* | (2014.01) | |
| *H04N 19/93* | (2014.01) | |

(52) U.S. Cl.
CPC ......... *H04N 19/176* (2014.11); *H04N 19/182* (2014.11); *H04N 19/44* (2014.11); *H04N 19/70* (2014.11); *H04N 19/91* (2014.11); *H04N 19/93* (2014.11)

(58) Field of Classification Search
CPC ........ H04N 19/44; H04N 19/70; H04N 19/91; H04N 19/93
USPC .................................................. 375/240.25
See application file for complete search history.

(56) References Cited

U.S. PATENT DOCUMENTS

| | | | |
|---|---|---|---|
| 10,097,848 B2* | 10/2018 | Chuang | H04N 19/46 |
| 2002/0159632 A1 | 10/2002 | Chui et al. | |
| 2012/0207222 A1 | 8/2012 | Lou et al. | |
| 2014/0301474 A1* | 10/2014 | Guo | H04N 19/93 |
| | | | 375/240.24 |
| 2016/0037164 A1* | 2/2016 | Joshi | H04N 19/44 |
| | | | 375/240.02 |
| 2016/0100179 A1 | 4/2016 | He et al. | |
| 2016/0330452 A1* | 11/2016 | Laroche | H04N 19/13 |

FOREIGN PATENT DOCUMENTS

| | | |
|---|---|---|
| JP | 2016-046814 A | 4/2016 |
| JP | 2017-520205 A | 7/2017 |
| JP | 2017-527193 A | 9/2017 |
| JP | 6778770 B2 | 11/2020 |
| KR | 10-2016-0024785 A | 3/2016 |
| KR | 10-2017-0007454 A | 1/2017 |
| KR | 10-2017-0039176 A | 4/2017 |
| WO | 2015/176685 A1 | 11/2015 |
| WO | 2016/022537 A1 | 2/2016 |
| WO | 2016/044974 A1 | 3/2016 |

OTHER PUBLICATIONS

Lai et al., "Non-CE6: Syntax Redundancy Removal for Palette Mode with One Index Value", JCTVC-S0099, MediaTek Inc., Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-2.
Pu et al., "Non-CE6: Syntax Redundancy Fixes for Palette Mode", JCTVC-S0110, Qualcomm Incorporated, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-5.
Xiu et al., "Non-CE6: On Context Modeling of Palette_Transpose_Flag", JCTVC-S0186, InterDigital Communications, LLC, Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-4.
Zhang et al., "CE6-Related: Syntax Fixes for Zero Palette in Palette Coding", JCTVC-S0105, MediaTek Inc., Joint Collaborative Team on Video Coding (JCT-VC) of ITU-T SG 16 WP 3 and ISO/IEC JTC 1/SC 29/WG 11, 19th Meeting: Strasbourg, FR, Oct. 17-24, 2014, pp. 1-5.
Bross et al., "High Efficiency Video Coding (HEVC) Text Specification Draft 10", JCTVC-L1003, 12th Meeting: Geneva, CH, Jan. 14-23, 2013, 321 pages.
Guo et al., "AHG8: Major-Color-Based Screen Content Coding", Microsoft Corporation, JCTVC-O0182, 15th Meeting: Geneva, CH, Oct. 23-Nov. 1, 2013, pp. 1-10.
Guo et al., "Evaluation of Palette Mode Coding on HM-12.0+RExt-4.1", Qualcomm Incorporated, JCTVC-O0218, 15th Meeting: Geneva, CH, Oct. 23-Nov. 1, 2013, pp. 1-6.
ITU/ISO/IEC, "Joint Call for Proposals for Coding of Screen Content", ISO/IEC JTC1/SC29/WG11 MPEG2014/N14175, San Jose, USA, Jan. 2014, 16 pages.
Joshi et al., "High Efficiency Video Coding (HEVC) Screen Content Coding: Draft 2", JCTVC-S1005, Strasbourg, France, Oct. 2014, 374 pages.
Joshi et al., "High Efficiency Video Coding (HEVC) Screen Content Coding: Draft 1", JCTVC-R1005-v2JCTVC-R1005-v2, Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, 362 pages.
Joshi et al., "Screen Content Coding Test Model 2 (SCM 2)", JCTVC-R1014, 17th Meeting: Valencia, ES, Mar. 27-Apr. 4, 2014, pp. 1-10.
Karczewicz et al., "Non CE1: Grouping Palette Indices at Front", Qualcomm Incorporated, JCTVC-T0065, 20th Meeting: Geneva, CH, Feb. 10-18, 2015, pp. 1-3.
Karczewicz et al., "Non-CE1: Harmonization of Grouping Palette Indices at Front (JCTVC-T0065) and Extended Copy above Mode to the First Line Test A.1.5 (JCTVC-T0036)", Qualcomm Incorporated, MediaTek Inc., JCTVC-T0231, 20th Meeting: Geneva, CH, Feb. 10-18, 2015, pp. 1-4.
Lin et al., "AHG8: P2M Based Dual-Coder Extension of HEVC", Tongji University, Shanghai, China, JCTVC-L0303, 12th Meeting: Geneva, CH, Jan. 14-23, 2013, pp. 1-5.
Pang et al., "Non-RCE3: 2-D MV Supported Intra Motion Compensation", Qualcomm Inc., JCTVC-N0256, 14th Meeting: Vienna, AT, Jul. 25-Aug. 2, 2013, pp. 1-5.
Pu et al., "Suggested Software for the AHG on Investigation of Palette Mode Coding Tools", Qualcomm Incorporated, JCTVC-P0303, 16th Meeting: San José, US, Jan. 9-17, 2014, 5 pages.
Sole et al., "AhG8: Requirements for Wireless Display Applications", Qualcomm, JCTVC-M0315, 13th Meeting: Incheon, KR, Apr. 18-26, 2013, pp. 1-2.
Sullivan et al., "Rate-Distortion Optimization for Video Compression", Signal Processing Magazine, IEEE, vol. 15, No. 6, Nov. 1998, pp. 74-90.
Sun et al., "CE1: Tests A.1: Extended Copy above Mode to the First Line (1.1-1.5)", MediaTek Inc., Qualcomm Incorporated, JCTVC-T0036, 20th Meeting: Geneva, CH, Feb. 10-18, 2015, pp. 1-8.
Sun et al., "CE1-related: Harmonization between JCTVC-T0065 Non CE1: Grouping Palette Indices at Front and CE1 Test A.1.5", MediaTek Inc, JCTVC-T0233, 20th Meeting: Geneva, CH, Feb. 10-18, 2015, pp. 1-6.
Tsai et al., "SCCE3: Test B.10—Palette Index Value Mapping". InterDigital Communications, Inc., JCTVC-R0169, 18th Meeting: Sapporo, JP, Jun. 30-Jul. 9, 2014, 4 pages.
Vermeir, Thijs, "Use Cases and Requirements for Lossless and Screen Content Coding", Barco, JCTVC-M0172, 13th Meeting: Incheon, KR, Apr. 18-26, 2013, pp. 1-6.
Xiu et al., "Description of Screen Content Coding Technology Proposal by InterDigital", InterDigital Communications, LLC, JCTVC-Q0037, 17th Meeting: Valencia, ES, Mar. 27-Apr. 4, 2014, 30 pages.
Xiu et al., "Removal of Parsing Dependency in Palette-Based Coding", JCTVC-S0181, Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, pp. 1-5.
Zhu et al., "AHGl0: Modified Copy above Mode for Palette Based Coding", Fujitsu Laboratories Ltd., JCTVC-Q0174, 17th Meeting: Valencia, ES, Mar. 27-Apr. 4, 2014, 3 pages.

(56) References Cited

OTHER PUBLICATIONS

Zhu et al., "Non-SCCE3: Modified Escaped Pixel Mode in Palette Based Coding", JCTVC-R0080, Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, pp. 1-4.

Joshi et al., "High Efficiency Video Coding (HEVC) Screen Content Coding: Draft 1", JCTVC-R1005-v3, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 360 pages.

Pu et al., "Non-RCE4: Refinement of the Palette in RCE4 Test 2", Qualcomm Incorporated, JCTVC-P0231, Joint Collaborative Team on Video Coding (JCT-VC) of ITU-T SG 16 WP 3 and ISO/IEC JTC 1/SC 29/WG 11 16th Meeting: San José, US, Jan. 9-17, 2014, pp. 1-4.

\* cited by examiner

FIG. 11D

PALETTE CODING FOR SCREEN CONTENT CODING

CROSS REFERENCE TO RELATED APPLICATIONS

This application is a Continuation Application of U.S. Non-Provisional application Ser. No. 14/875,735, filed Oct. 6, 2015; which claims the benefit of U.S. Provisional Patent Application No. 62/060,536, filed Oct. 6, 2014, and U.S. Provisional Patent Application No. 62/120,293, filed Feb. 24, 2015 the disclosures of which are incorporated herein by reference in their entirety.

BACKGROUND

Screen content sharing applications have become more popular in recent years with the expanded use of remote desktop, video conferencing, and mobile media presentation applications. Compared to the natural video content, the screen content may include numerous blocks with several major colors and sharp edges due to, for example, sharp curves and text inside. Existing video compression methods may not fully characterize the feature of screen content and may lead to a low compression performance, for example, reconstructed pictures may have quality issues. For example, the curves and text may be blurred and/or they may be difficult to recognize. Therefore, a well-designed screen compression method is needed for effectively reconstructing screen content.

SUMMARY

A decoder may perform palette decoding of a coding unit (CU) of a picture. For example, the decoder may parse a palette index run value of the CU. The palette index run value may indicate an index run or a copy run. The palette index run value may indicate a length of consecutive palette indices for corresponding pixel positions in the CU, and at least one of the consecutive palette indices may corresponds to an escape color index. For example, the consecutive palette indices may correspond to a first escape color index and a second escape color index.

The decoder may reconstruct the consecutive palette indices for the corresponding pixel positions of the CU according to the palette index run values. The decoder may reconstruct color values for the corresponding pixel positions of the CU according to the consecutive palette indices and one or more palette_escape_val values. For example the decoder may parse, during a first pass, palette syntax values sufficient to reconstruct all palette indices in the CU (e.g., which may include a palette mode flag(s), a palette index value(s), and/or a run value(s) for index mode, or a palette mode flag(s) and/or a run value(s) for copy mode) other than the one or more palette_escape_val values, and parse, during a second pass, the one or more palette_escape_val values for the corresponding pixel positions in the CU for which the palette index parsed from the first pass corresponds to the escape color index.

A decoder may performing palette decoding for a CU of a picture. The decoder may determine a palette table size for a coding unit (CU) of a picture. For example, the decoder may determine that the palette table size of the CU is zero. The palette table size for the CU being equal to zero may indicate that all pixels of the CU are coded as escape colors. If the decoder determines that the palette table size of the CU is zero, than the decoder may decode the escape values (e.g., by inferring that a palette_escape_val_present_flag for the CU is equal to one). For example, the palette_escape_val_present_flag may not be received for the CU if the palette table size is zero. If the decoder determines that the palette table size of the CU is a value other than zero, than the decoder may parse a palette_escape_val_present_flag for the CU. The decoder may reconstruct palette indices for corresponding pixel positions of the CU based on a palette table for the CU and a value associated with the palette_escape_val_present_flag of the CU.

A decoder may performing palette decoding for a CU of a picture. The decoder may determine that a coding unit (CU) of a picture comprises a single major color (e.g., only one major color) or only escape colors. The decoder may determine that the CU is encoded according to an index mode and a palette index mode (e.g., based on not receiving a palette_mode for the CU). The decoder may reconstruct color values for the corresponding pixel positions of the CU. The decoder may determine that a run value of the index mode for the CU is equal to a size of the CU minus one based on not receiving a syntax value indicative of a palette run value for the CU. The decoder may determine that the palate index value for the CU is equal to zero based on not receive a palette index value for the CU. The decoder may determine that a palette_escape_val_present_flag for the CU is equal to zero and/or determine that a palette table size for the CU is equal to one, for example, to determine that the CU comprises a single major color. The decoder may determine that a palette_escape_val_present_flag for the CU is equal to one and/or determine that a palette table size for the CU is equal to zero, for example, to determine that the CU comprise only escape colors. The decoder may infer the palette_mode of the CU to be equal to zero based on not receiving the palette_mode for the CU. The decoder may receive a palette_escape_val for one or more pixel positions (e.g., each pixel position) in the CU, for example, if the CU comprises only escape colors.

Sketch copy mode may be used to code blocks comprising irregular lines, syntax redundancy may be removed from blocks with special characteristics, and/or run value coding may be simplified.

The parsing dependencies in palette coding design may be removed. For example, the context modeling dependency of the syntax element palette_transpose_flag may be removed, for example, using one single context. The context modeling dependency of the syntax element palette_mode may be removed, for example, by using run-length coding without using context or using one single context. The syntax parsing dependencies and/or the syntax signaling dependencies that are related with escape color signaling may be removed. A palette table generation process may handle input screen content video with high bit depths, for example, at the encoder side.

BRIEF DESCRIPTION OF THE DRAWINGS

FIG. 11D illustrates an example of a coding order in a reverse vertical traverse scan.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

The screen display of mobile devices may be able to display high definition resolution content, ultra-high definition resolution content, and/or the like. Video coding tools, such as block coding modes and transform, may not be optimized for screen content encoding.

Figure 1:
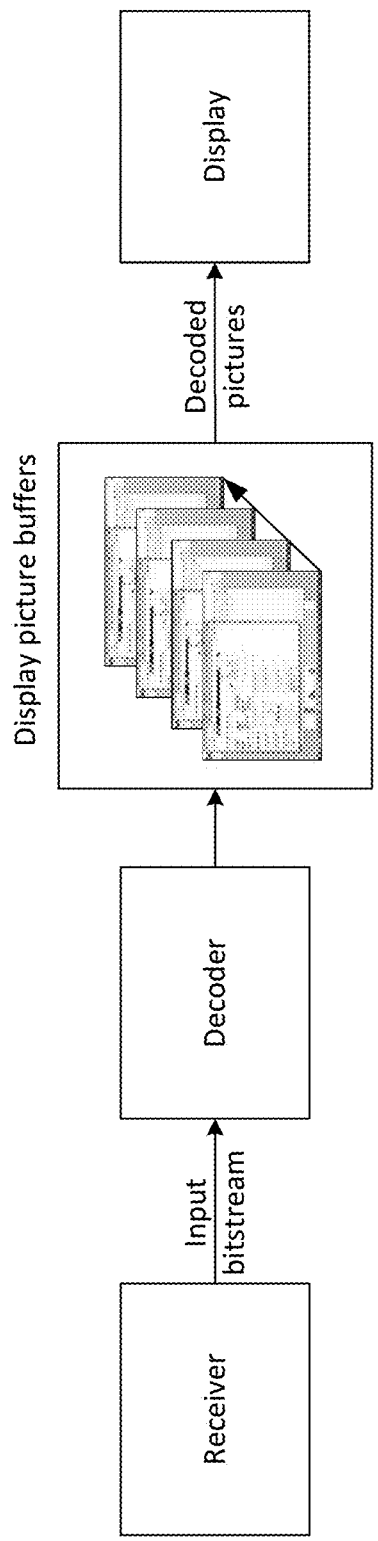
FIG. 1 is a diagram that illustrates an example block diagram of a screen content sharing system.
Figure 2:
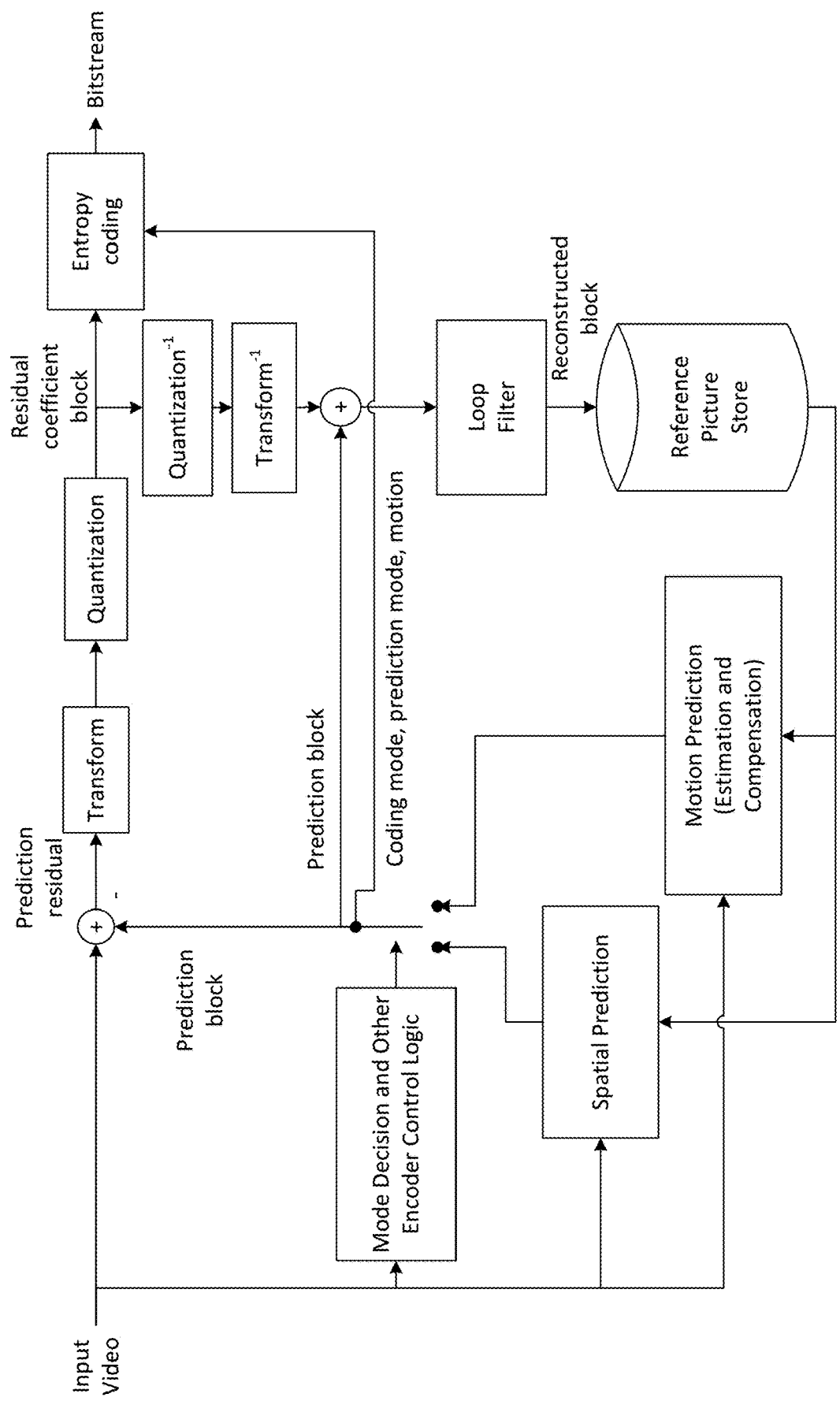
FIG. 2 is a diagram illustrating an example of a block-based single layer video encoder.
Figure 3:
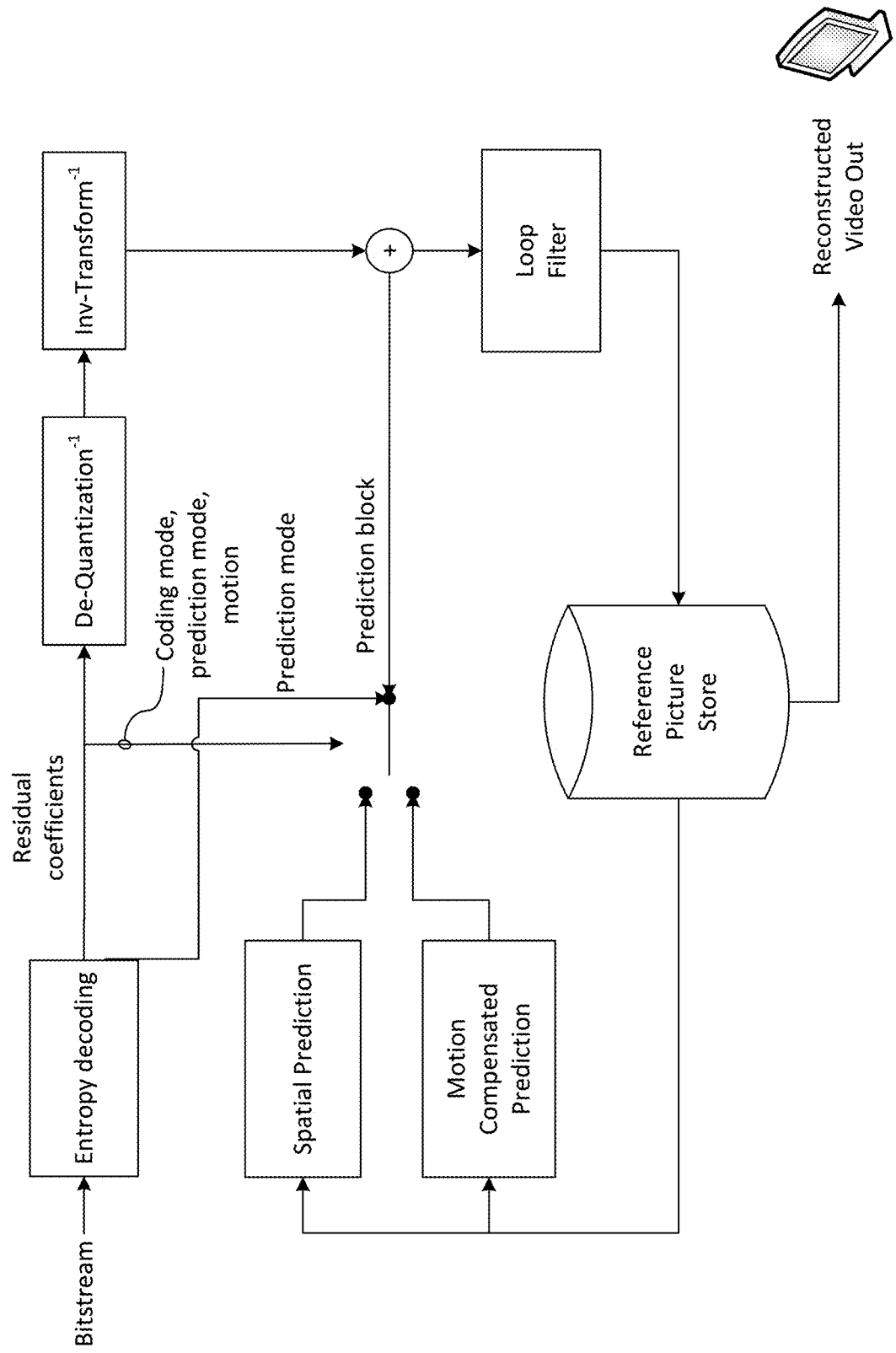
FIG. 3 is a diagram illustrating an example of a block-based single layer video decoder.

FIG. 1 is a diagram that illustrates an example block diagram of a screen content sharing system. The screen content sharing system may include a receiver, a decoder, and/or a display (renderer). FIG. 2 is a diagram illustrating an example of a block-based single layer video encoder. FIG. 3 is a diagram illustrating an example of a block-based single layer video decoder. The video decoder of FIG. 3 may receive a video bitstream produced by the encoder of FIG. 2. The video decoder may reconstruct the video signal to be displayed. At the video decoder, the bitstream may be parsed by an entropy decoder. The residual coefficients may be inverse quantized and inverse transformed to obtain the reconstructed residual. The coding mode and/or prediction information may be used to obtain the prediction signal using spatial prediction and/or temporal prediction. The prediction signal and/or the reconstructed residual may be added together to generate the reconstructed video. The reconstructed video may go through loop filtering before being stored in a reference picture store. The reconstructed video may be displayed and/or to be used to decode future video signal(s).

A single layer encoder may employ spatial prediction (e.g., intra prediction) and/or temporal prediction (e.g., inter prediction and/or motion compensated prediction) to predict the input video signal. The encoder may include mode decision logic that selects a form of prediction, for example, based on rate and/or distortion considerations. The encoder may transform and quantize the prediction residual (e.g., the difference signal between the input signal and the prediction signal). The quantized residual, the mode information (e.g., intra or inter prediction), and/or prediction information (e.g., motion vectors, reference picture indexes, intra prediction modes, and/or the like) may be compressed at the entropy coder and packed into the output video bitstream. As shown in FIG. 2, the encoder may generate the reconstructed video signal by applying inverse quantization and inverse transform to the quantized residual to obtain a reconstructed residual, and add the reconstructed residual to the prediction signal. The reconstructed video signal may go through loop filter process (e.g., deblocking filter, Sample Adaptive Offsets, Adaptive Loop Filters, and/or the like) The reconstructed video signal may be stored in the reference picture store to be used to predict future video signal.

High Efficiency Video Coding (HEVC) may be a block based hybrid video coding standard, in that its encoder and decoder may operate substantially in accordance with the example encoder and decoder of FIG. 2 and FIG. 3. HEVC may allow the use of larger video blocks and/or may use quadtree partition to signal block coding information. The picture or slice may be partitioned into coding tree blocks (CTB) with the same size (e.g., 64×64). A CTB may be partitioned into CUs with quadtree. A CU may be partitioned into prediction units (PU) and/or transform units (TU) with quadtree.

Figure 4:
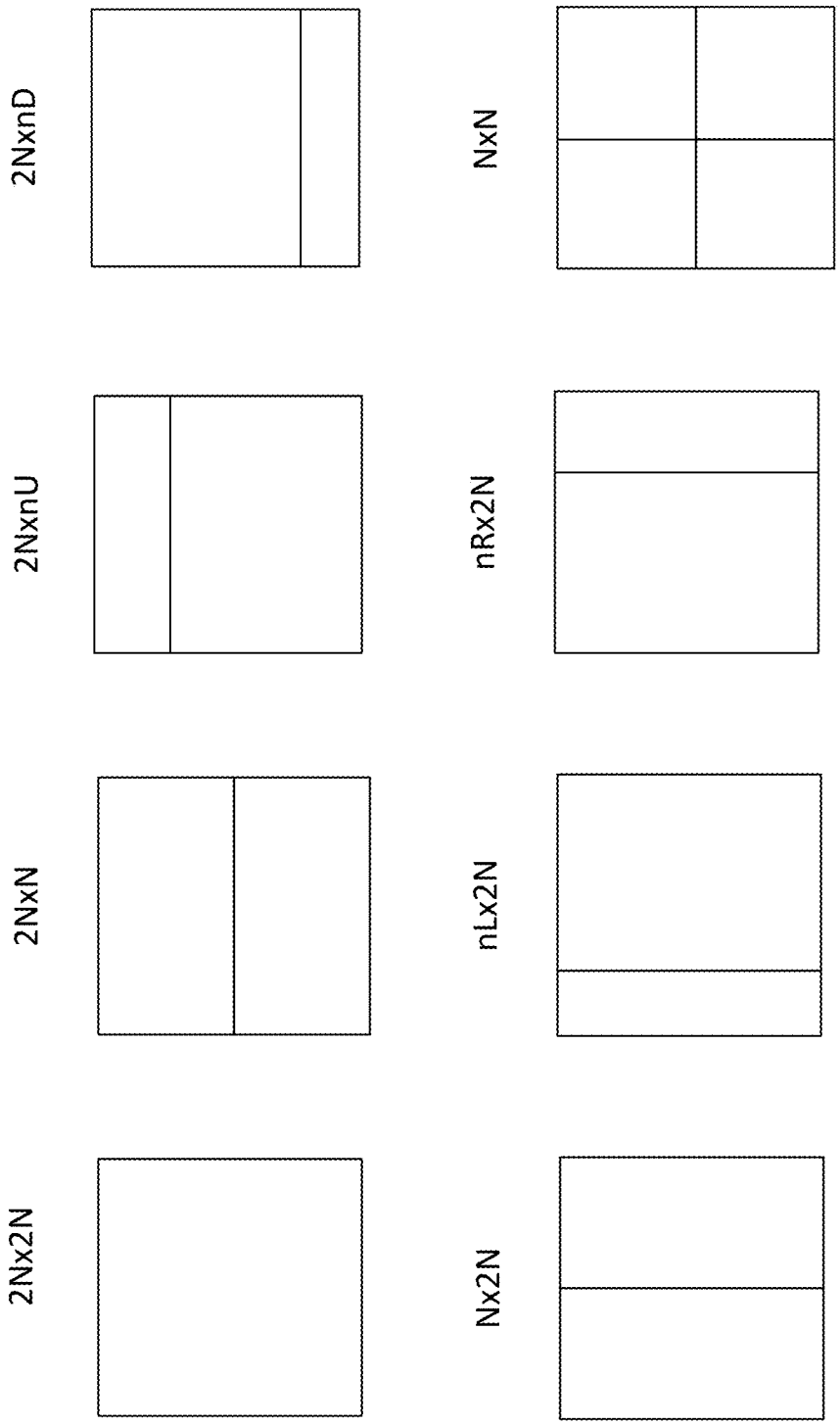
FIG. 4 is a diagram illustrating an example of eight partition modes.

FIG. 4 is a diagram illustrating an example of eight partition modes. For an inter-coded CU, its PU may be one of eight partition modes, for example, as shown in FIG. 4. Temporal prediction (e.g., motion compensation) may be applied to reconstruct inter-coded PUs. Depending on the precision of the motion vectors (e.g., which may be up to quarter pixel in HEVC), linear filters may be applied to obtain pixel values at fractional positions. The interpolation filters may have seven or more taps for luma and/or four taps for chroma. The deblocking filter in HEVC may be content based, for example, such that different deblocking filter operations may be applied at the TU and PU boundaries, for example, depending on coding mode difference, motion difference, reference picture difference, pixel value difference, and/or the like. For entropy coding, HEVC may use context-based adaptive arithmetic binary coding (CABAC) for block level syntax elements (e.g., except high level parameters). CABAC coding may include context-based coded regular bins and/or by-pass coded bins without context.

HEVC may be focused on continuous tone video content in 4:2:0 format. The mode decision and transform coding tools may not be optimized for the discrete tone screen content, for example, which may be captured in the format of 4:4:4 video.

Figure 5A:
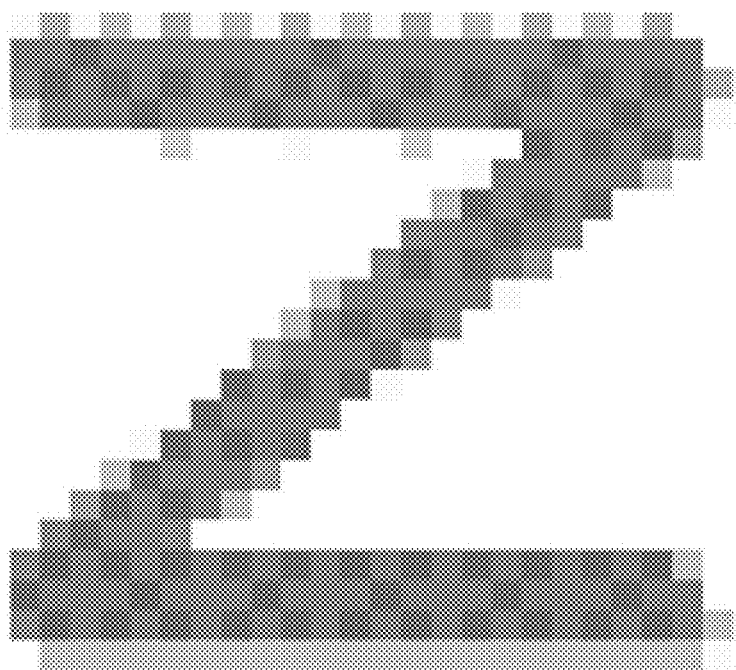
FIG. 5A is a diagram illustrating an example of a screen content block.
Figure 5A:
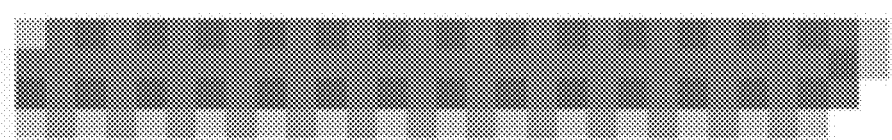
Figure 5B:
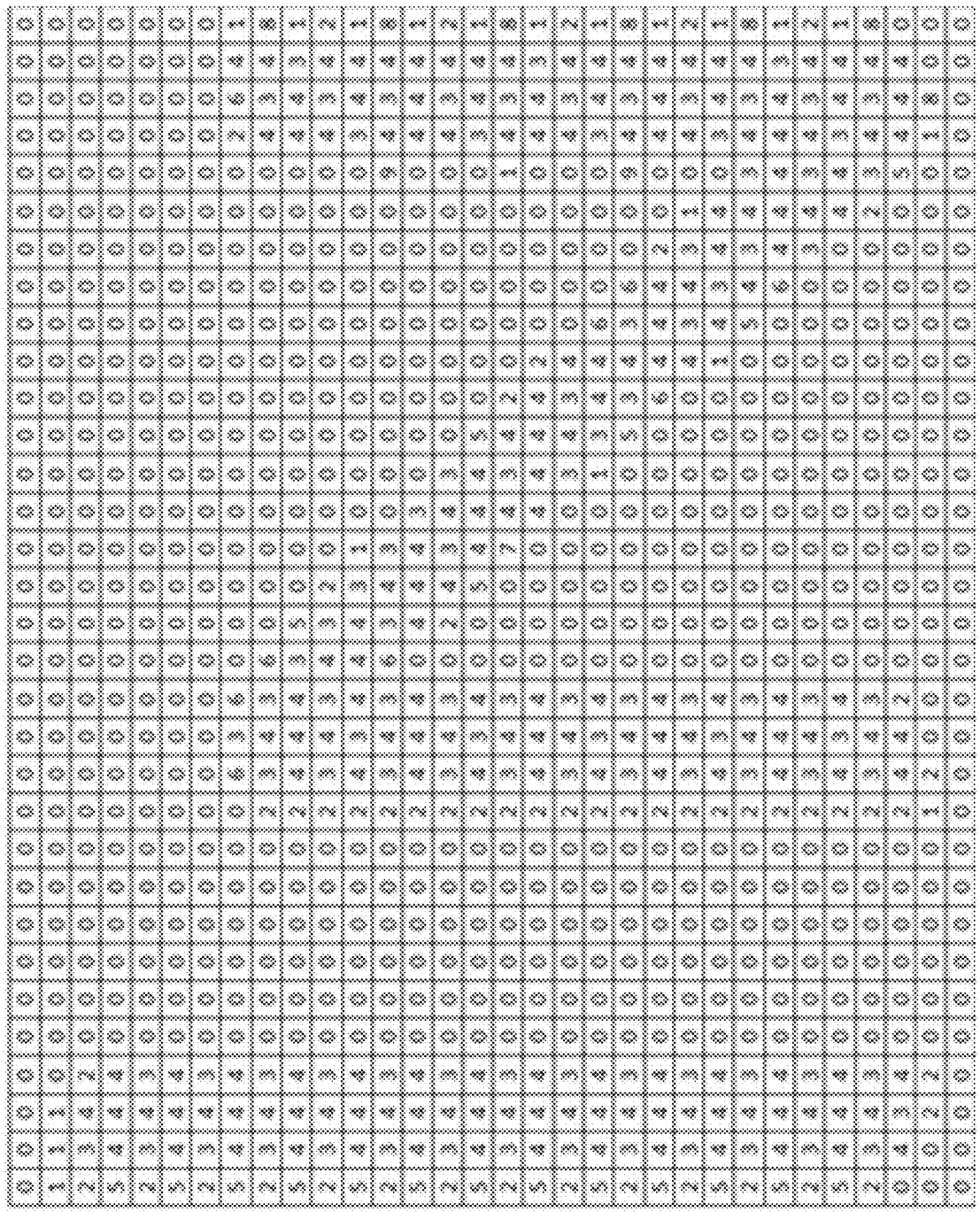
FIG. 5B is a diagram illustrating an example of a palette index map of the screen content block of FIG. 5A.

FIG. 5A is a diagram illustrating an example of a screen content block. FIG. 5B is a diagram illustrating an example of a palette index map of the screen content block of FIG. 5A. As shown in FIG. 5A, screen content blocks may include a limited number of colors, and the color value of each pixel may be repeated from its above and/or left pixel. Instead of directly coding the pixel value, a palette table may be used as a dictionary to record significant color values. And the corresponding palette index map may be used to represent the color value of each pixel, for example, as shown in FIG. 5B. The run values may be used to indicate the length of consecutive pixels that have the same color (e.g., palette index) to reduce the spatial redundancy. Using a palette based coding method rather than the conventional block coding modes may improve the compression performance of coding screen content.

Figure 11A:
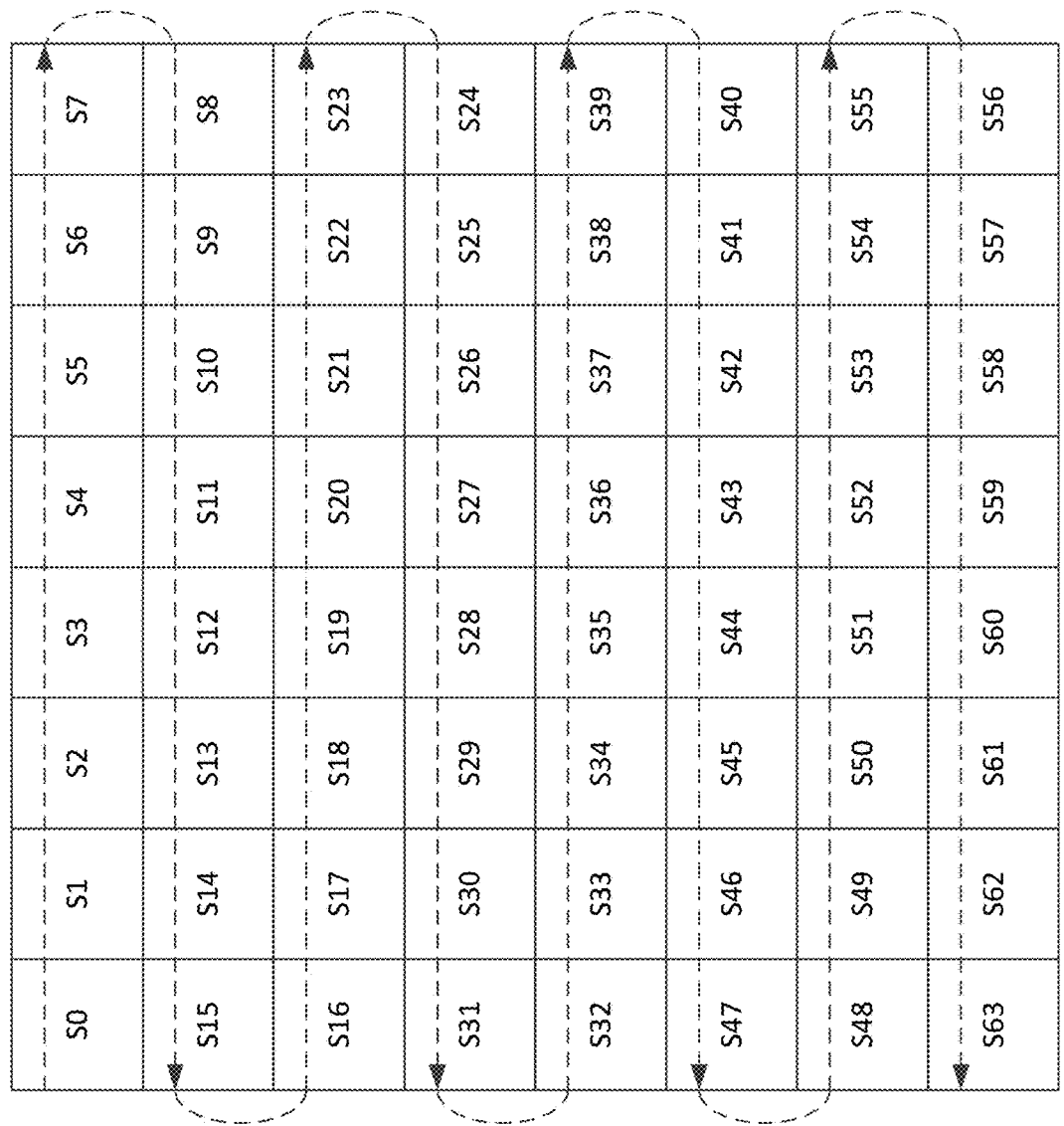
FIG. 11A illustrates an example of a coding order of a horizontal traverse scan.
Figure 11B:
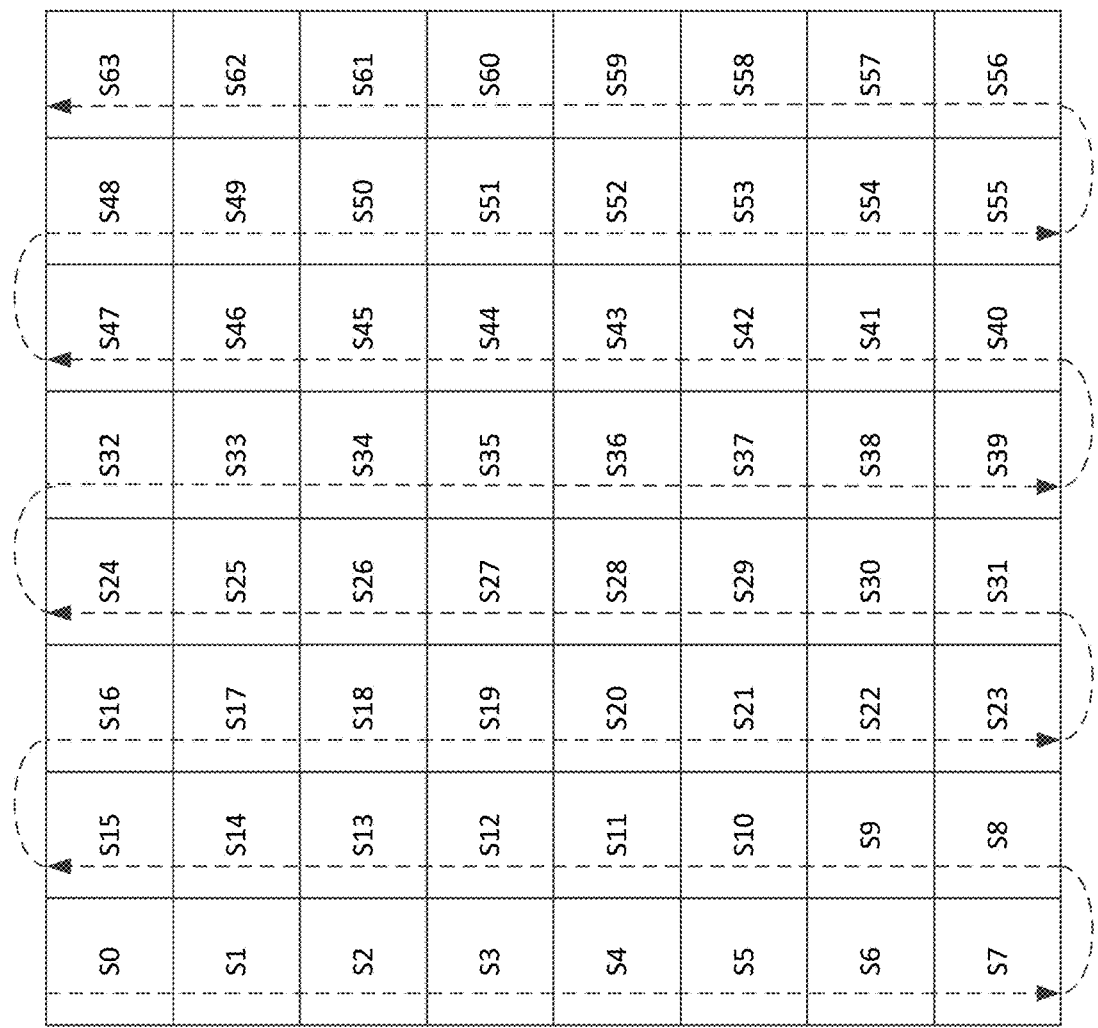
FIG. 11B illustrates an example of a coding order of a vertical traverse scan.

Palette coding modes may include an index mode (e.g., run mode) and/or a copy mode. In the index mode, the color index may be coded first. If the color index is equal to the palette table size, it may indicate that an escape color is not included in the palette table. And the color value may be explicitly coded following the color index. If the color index is less than the palette table size, which may mean a major color in the palette table, then a run value may be coded to signal how many continuous pixels in the scanning order have the same color as that coded color. In the copy mode, the run value may be coded to indicate how many pixels have the same color as its above pixel. Scanning orders may include, but are not limited to, a horizontal traverse scan and/or a vertical traverse scan, for example, as shown in FIG. 11A and FIG. 11B and as described herein.

For pixel positions coded in run code, the palette index of the first position in the run-length chain may be present in the bit-stream. Palette indices may be binarized using truncated binary code (TBC) and/or coded in bypass mode. TBC may be a variant of fixed length code (FLC) and/or used for alphabets with uniform distributions. TBC may degenerate to FLC when the size of the alphabet is a power of two. For example, for one palette index level pLevel, it may be assumed that its maximum value pMax is known. As an example, n=pMax+1 and k=floor([ log ]_2 (n)) such that $2^k \le n < 2^{(k+1)}$ and $u=2^{(k+1)}-n$. The palette index may be binarized, for example, as follows: if pLevel<u, the codeword may be specified by the binary representation of pLevel with length k; otherwise, the codeword may be specified by the binary representation of pLevel+u with length k+1. Table 1 provides an example of palette index binarization when pMax=8.

TABLE 1

Example of TBC binarization with pMax = 8

| Level | Codeword |
| --- | --- |
| 0 | 000 |
| 1 | 001 |
| 2 | 010 |
| 3 | 011 |
| 4 | 100 |
| 5 | 101 |
| 6 | 110 |
| 7 | 1110 |
| 8 | 1111 |

As can be seen from Table 1, before binarizing one palette index level, the maximum level pMax may be specified as an input to the TBC process.

To exploit the correlations between palette indices in one palette-coded CU, one redundancy removal method may be applied to improve the efficiency of palette index coding by reducing the magnitude of coded palette indices and/or the maximum length of TBC codewords. For example, one or more of the following conditions may be checked before coding one palette index in the index mode. If the left neighbor of the current pixel position is coded in the index mode, then the current palette index may be the same as that of its left neighbor. Otherwise, if the two palette indices are the same, the palette indices may be coded together in index mode with a larger run-length. If the left neighbor of the current pixel position is coded in copy mode, then the current palette index may be the same as that of its above neighbor. Otherwise, if the two palette indices are the same, the palette indices may be coded together in copy mode with a larger run-length. Therefore, if either of the above two conditions are satisfied, the palette index pLevel and/or the maximum TBC value pMax may be reduced (e.g., by one), which may decrease the codeword length used to present the palette index of the current pixel position.

Figure 12A:
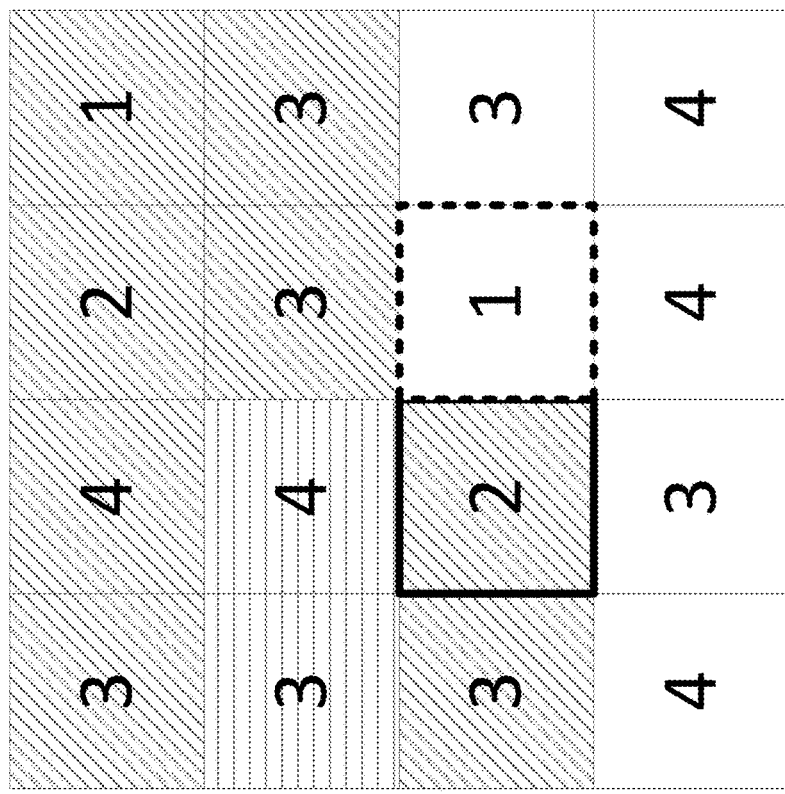
FIG. 12A is a diagram illustrating an example of a redundancy removal method of palette index coding where the CPI position is coded in index mode.
Figure 12B:
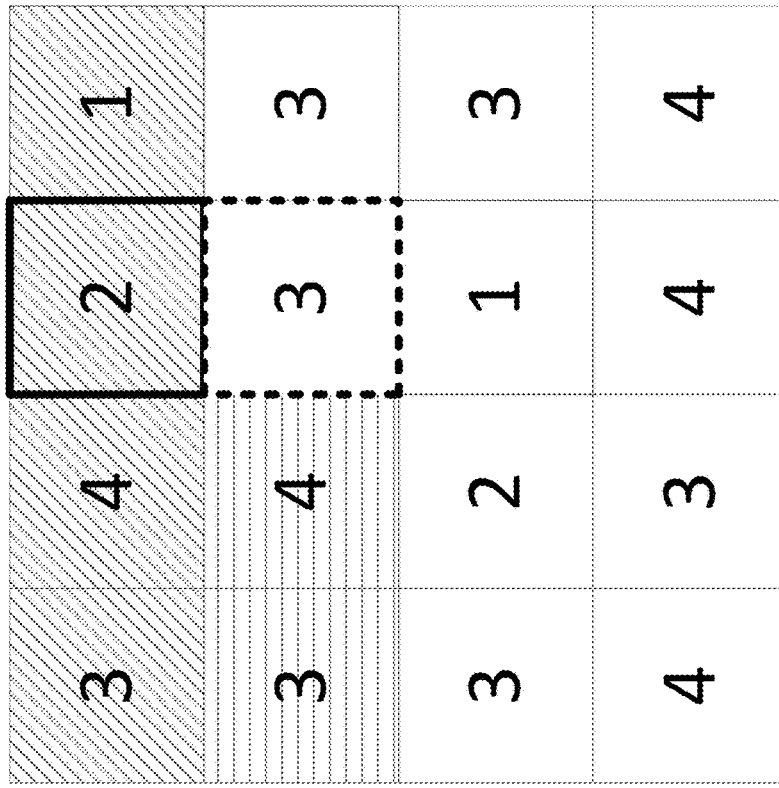
FIG. 12B is a diagram illustrating an example of a redundancy removal method of palette index coding where the CPI position is coded in copy mode.

FIG. 12A is a diagram illustrating an example of a redundancy removal method of palette index coding where the CPI position is coded in index mode. FIG. 12B is a diagram illustrating an example of a redundancy removal method of palette index coding where the CPI position is coded in copy mode. FIG. 12A and FIG. 12B illustrate examples of the redundancy removal process when the left neighboring pixel is coded in index mode (e.g., as shown in FIG. 12A) and in copy mode (e.g., as shown in FIG. 12B). The compared palette index (CPI) position k that is referred by the current pixel position i, as enclosed by the dashed black line in FIG. 12A and FIG. 12B, may be calculated as follows:

$$k = \begin{cases} i-1, & \text{if CPI position is coded in run mode} \\ i - iWidth, & \text{if CPI position is coded in copy mode} \end{cases}$$

where iWidth is the width of the current CU.

The palette index may be independently coded rather than coded in index mode or copy mode, for example, although escape colors may be indicated by the palette index which is equal to the palette size in the current palette coding design. In other words, one run-length chain of pixel positions with the same palette index value may be broken when an escape color position is scanned. As the palette index used for escape colors may not be involved in the run-length based coding, the above redundancy removal algorithm used when coding palette indices may be applicable (e.g., only applicable) if the corresponding CPI position is not a position with an escape color.

Figure 13:
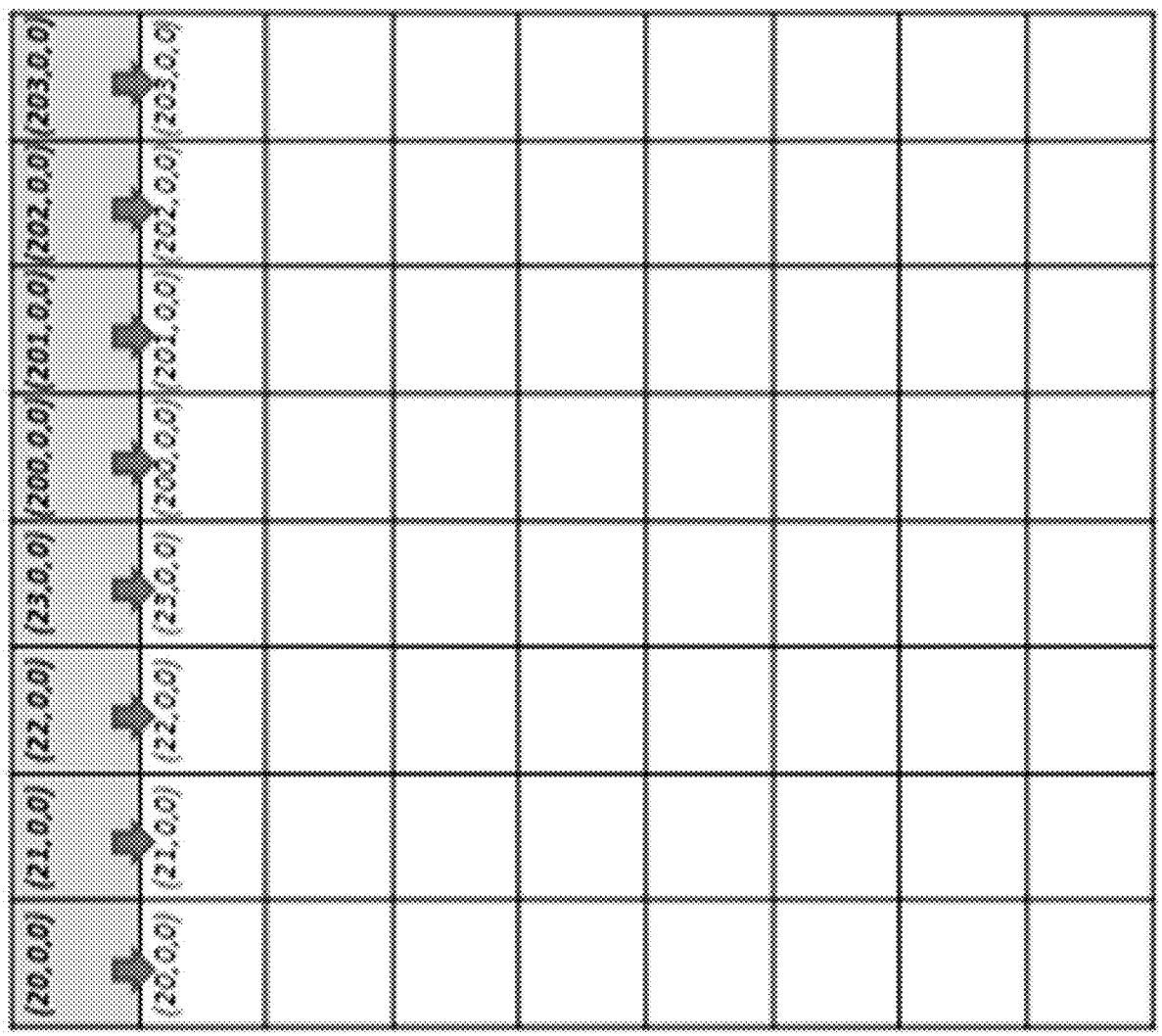
FIG. 13 is a diagram of an example of extended copy mode.

For copy mode, palette indices may be predicted from the above decoded indices in the above row. For the pixels in the first row of one palette CU, the copy mode may be disabled such that they are coded (e.g., always coded) by index mode, for example, because the above reference pixels exceed the CU boundary. The copy mode may be enabled for the pixels in the first row (e.g., or the first column when palette_transpose_flag is equal to 1) by using the boundary pixels of the neighboring CUs as reference, for example, in order to improve the efficiency of copy mode. FIG. 13 shows one example of the extended copy mode when palette_transpose_flag is equal to 0 (e.g., horizontal scan order). To reconstruct the color indices of the first row of the current CU, if the indices are encoded by copy mode, the decoder may reconstruct them from the corresponding neighboring reference pixels (NCPs) from the above neighboring CU. The color values of NCPs may be used for the copy mode of the first line and the decoder may not have or derive palette indices of NCPs, for example, as shown in FIG. 13. Therefore, palette index coding redundancy removal method may not be applied to pixels whose CPI pixels make reference to NCPs. For example, if the preceding pixel of the current pixel in the scan order is coded in copy mode and the above neighbor of the current pixel (e.g., the CPI position) refers to one NCP, the index coding redundancy removal method may be disabled.

The syntax elements may be binarized into a string of bins, in which bypass bins and context-coded bins may be coded separately by the engine of binary arithmetic coding (BAC), for example, for the context-based binary arithmetic coding (CABAC) that is used for palette mode and the other coding modes in HEVC screen content coding extension. For context-coded bins, context models (e.g., probability models) may be maintained for the BAC at both encoding and decoding. For bypass bins, syntax elements may be coded without context models. Grouping bypass bins together into longer chains may increase the number of bins processed per cycle (e.g., parsing throughout), which may be used for coding multiple syntax elements in HEVC, such as motion vector coding and coefficient coding, for example. The syntax element of palette index coding, (e.g., palette_index_idc) may be bypass coded and/or interleaved with other context-coded syntax elements, such as, palette_run_type and palette_run_msb_id_plus1, for example, for palette design in HEVC screen content coding. The parsing of palette_index_idc may be grouped together and put in front of the other context coded syntax elements, for example, to improve the parsing throughput. Table 2 is an example of such a syntax table of palette coding.

TABLE 2

Example of Palette Syntax

| | Descriptor |
|---|---|
| palette_coding( x0, y0, nCbS ) { | |
| ... | |
|   if( indexMax > 0 ) { | |
|     palette_transpose_flag | ae(v) |
|     palette_num_indices | |
|     for( i = 0; i < palette_num_indices; i++ ) | ae(v) |
|       palette_index_idc | |
|     last_palette_run_type_flag | ae(v) |
|     indicesLeft = palette_num_indices | ae(v) |
|   } | |
|   scanPos = 0 | |
|   while( scanPos < nCbS * nCbS ) { | |
|     ... | |
|     if( indexMax > 0 && scanPos > = nCbS && palette_run_type_flag[ xcPrev ][ ycPrev ] ! = COPY_ABOVE_MODE && indicesLeft && scanPos < nCbS * nCbS - 1) { | |
|       palette_run_type_flag[ xC ][ yC ] | ae(v) |
|     } | |
|     indicesLeft -= 1 | |
|     if( indexMax > 0 && (indicesLeft | | palette_run_type_flag != last_palette_run_type_flag)) { | |
|       maxPaletteRun = nCbS * nCbS - scanPos - 1 | |
|       ... | |
|     } | |
|   } | |
| } | |

The syntax element num_palette_index may specify the number of palette index signalled in the current block. The syntax element palette_last_run_type_flag may specify the palette coding mode of the last run in the current block.

One or more embodiments described herein may be written using the HEVC standard as the underlying video coding standard, however, the embodiments may be applied to other video codecs.

Figure 6:
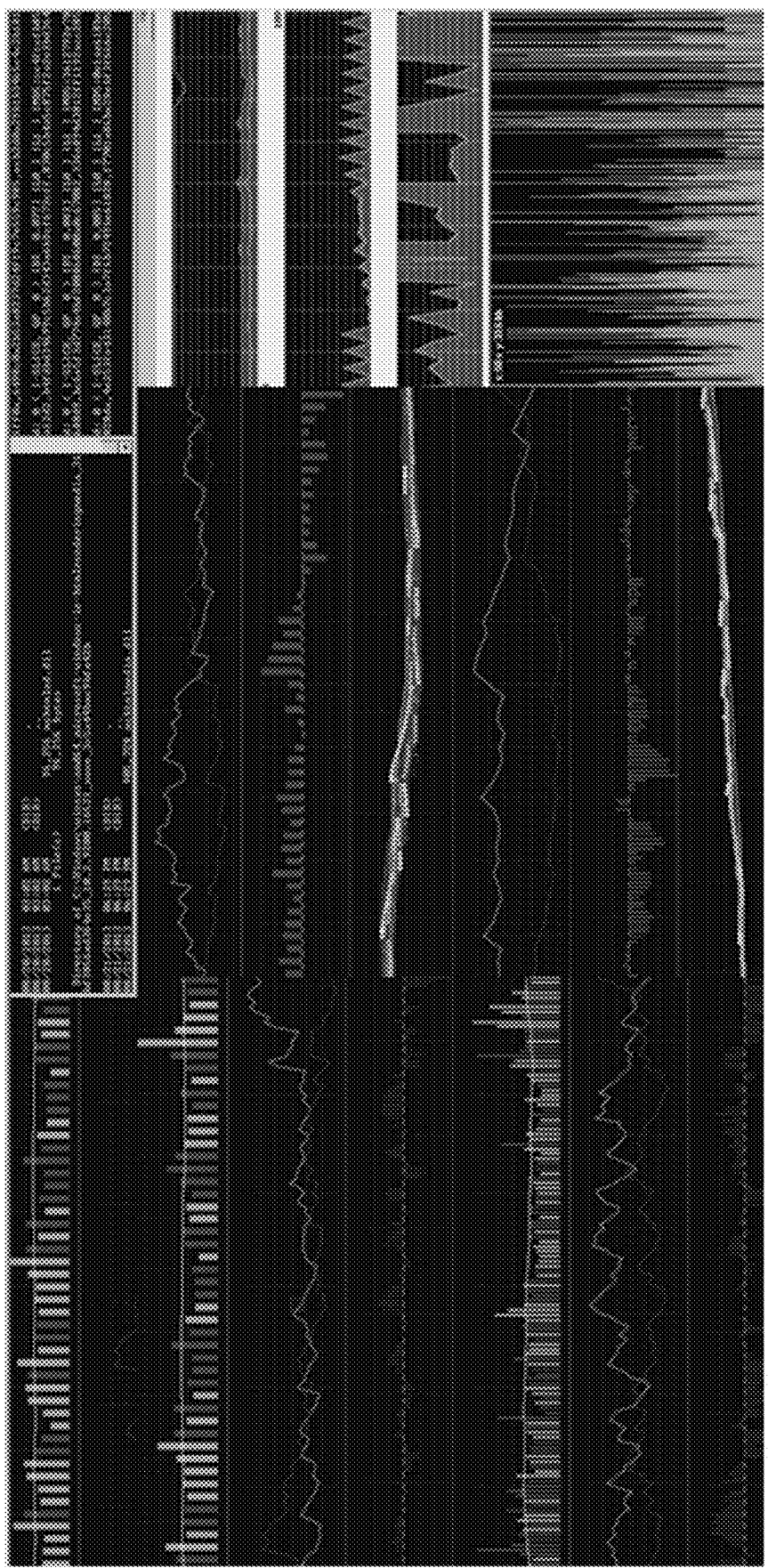
FIG. 6 is a diagram illustrating an example SCC test sequence for a console.

Palette coding efficiency may be provided. The palette coding may code horizontal lines and/or vertical lines. If it is a horizontal line, the index mode may code continuous pixels with a run value (e.g., a large run value). If it is a vertical line, then the vertical line may be treated as a horizontal line in a vertical traverse scan order, for example, as shown in FIG. 11B. Lines in various directions may be used in screen content. FIG. 6 is a diagram illustrating an example SCC test sequence for a console.

Figure 7A:
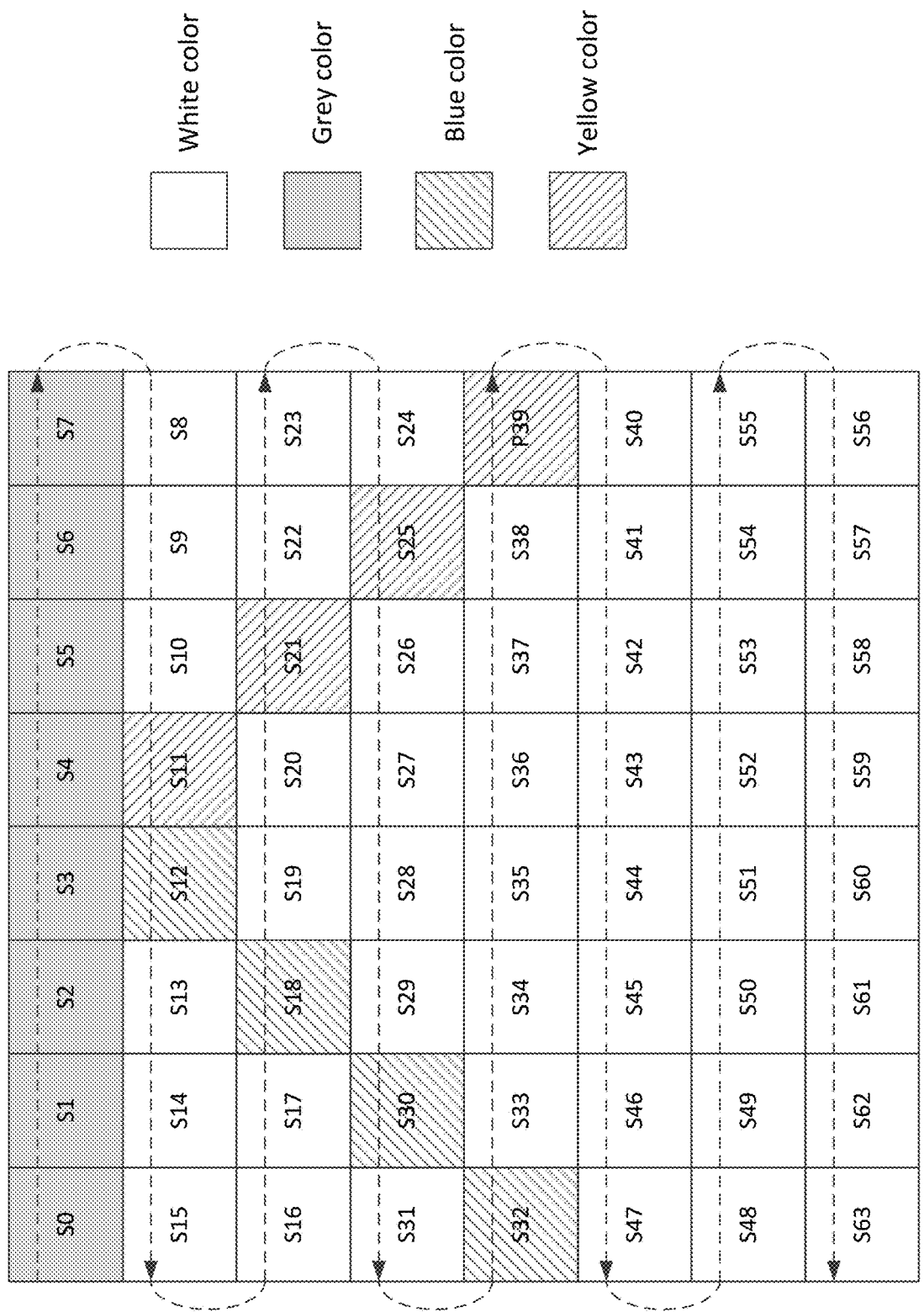
FIG. 7A is a diagram illustrating an example 8×8 block with four colors, where the dashed line illustrates a scanning order in palette coding.
Figure 7B:
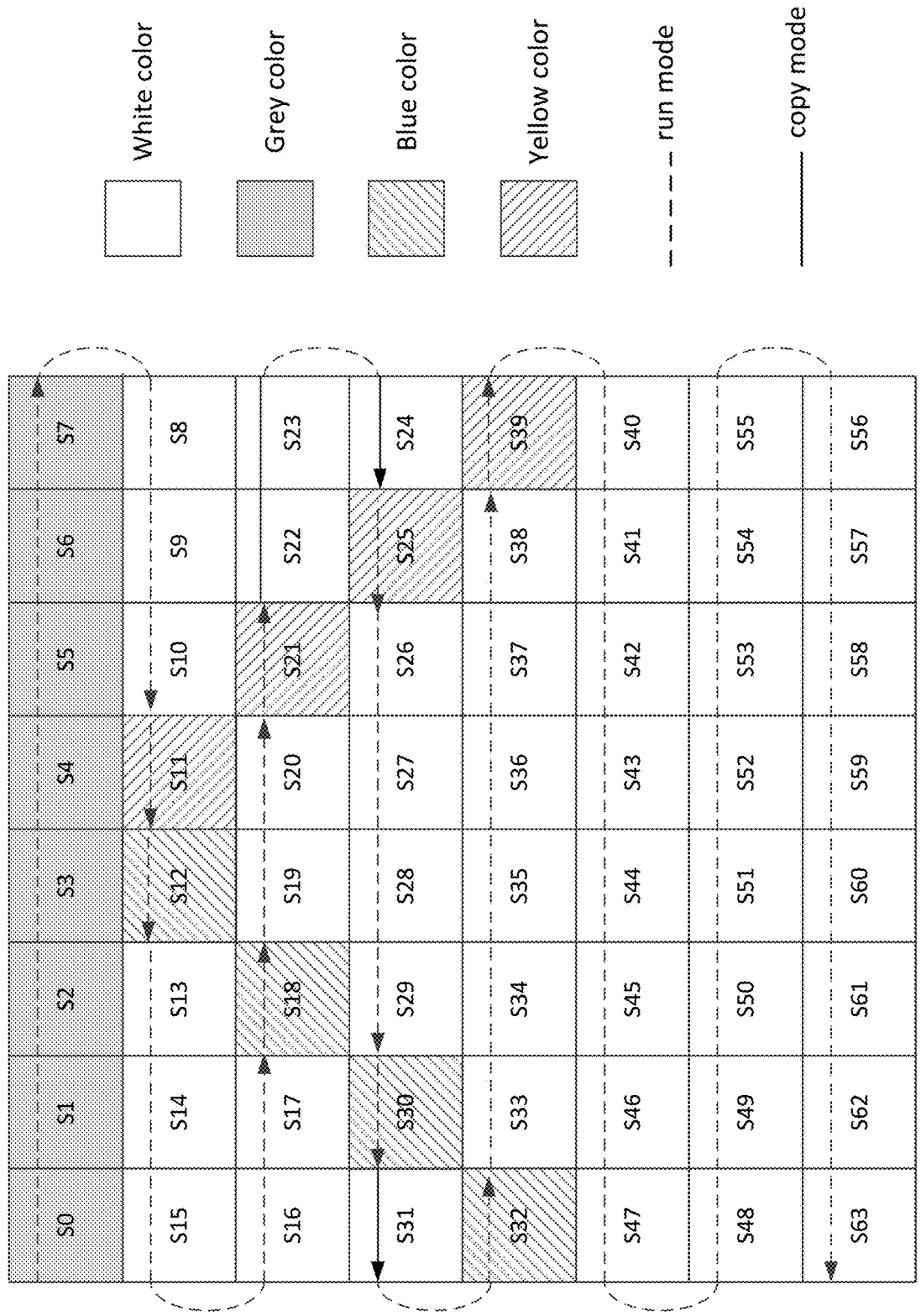
FIG. 7B is a diagram illustrating an example 8×8 block with four colors, where the dashed line illustrates a scanning order in palette coding that uses index mode and copy mode.

Lines that are not in a horizontal direction or a vertical direction may be referred to as irregular lines. A block may be partitioned into a plurality of discontinuous segments, for example, if there are irregular lines. It may be difficult to encode the plurality of discontinuous segments with existing palette coding modes in an efficient way. FIG. 7A is a diagram illustrating an example 8×8 block with four colors, where the dashed line illustrates a scanning order in palette coding. FIG. 7B is a diagram illustrating an example 8×8 block with four colors, where the dashed line illustrates a scanning order in palette coding that uses index mode and copy mode. For example, there may be two irregular lines in one 8×8 block, for example, as shown in FIG. 7A. There may be four kinds of colors, white, grey, blue, and yellow, which may be illustrated in FIG. 7A and FIG. 7B as different hash lines and/or shading. FIG. 7B illustrates an example of palette coding with run and copy mode in horizontal traverse scanning order for the 8×8 block. In total, 17 runs may be coded with index mode, for example, shown in black dashed lines and copy modes shown in black solid lines.

Parsing dependencies of palette coding may be provided. For example, given the high coding efficiency of palette coding for screen content, there may be a large percentage of CUs that select palette coding as the optimal coding mode, and thus palette coding may limit data parsing dependencies to enable high-throughput implementations. There may be a plurality of different kinds of dependencies in palette coding design. For example, context modeling dependencies may be used, which may refer to the dependencies in context derivation of one syntax element on previously coded syntax elements. Syntax parsing dependencies may be used, which may refer to the dependencies that the decoded value of one syntax element at a pixel position is used as an input to the parsing of the syntax elements for the following pixel positions. Syntax signaling dependencies may be used, which may refer to the dependencies that the signaling of one syntax element may be dependent on the decoded value of other syntax elements.

Context modeling dependencies may be provided. Context modeling dependency of a palette_transpose_flag may be provided. Horizontal traverse scans and/or vertical traverse scans may be enabled to scan the palette indices of one palette-coded CU. One flag palette_transpose_flag may be signaled for each CU coded with palette mode to select one of the two scan patterns for the current CU. Two context models may be used to code the flag palette_transpose_flag, which may be selected depending on whether the palette indices of the left neighboring CU of the current CU are scanned horizontally or vertically. The neighbor-based context modeling approach may provide higher coding efficiency. The neighbor-based context modeling approach may not allow for a high degree of parallelism because two neighboring palette-coded CUs, which may not be decoded simultaneously. The neighbor-based context modeling approach may use one additional buffer to store the status of a palette_transpose_flag for a left neighboring CU.

Context modeling dependency of palette_mode may be provided. A flag palette_mode may be signaled for one or more pixel positions, for example, except for the pixel positons in the first row of one palette-coded CU (e.g., as there may be no above pixels to copy, the copy mode may be invalid for the pixel positions in the first row). Two context models may be used to code the palette_mode flag, which may be determined based on the value of the same syntax element of the collocated pixel in the above row. Accordingly, the context modeling dependency of palette_mode approach may reduce the throughput, as the determination of the context at one pixel may be dependent on the palette index coding mode of pixels preceding it in the scan order.

Dependencies related to escape color signaling may be provided. Syntax parsing dependencies of palette_index may be provided. For pixels coded in index mode, the palette index of the first pixel in the run-length chain may be signaled via the syntax element palette_index. The syntax element palette_index may be binarized using TBC, for which the maximum value of palette index (e.g., pMax) may be used as input to the TBC process. The calculation of the input pMax to the TBC process of one pixel position may be dependent on whether the left neighbor and the CPI position of the current pixel position are coded as escape colors or not, for example, because the redundancy removal approach may be applied to palette index coding and the palette index used to indicate escape colors may not be coded in index mode or copy mode. For example, if the left neighbor or the CPI position of the current pixel position is coded as an escape color, pMax may be set to the palette table size 〖Size〗_PLT of the current CU. Otherwise (e.g., if both the left neighbor and the CPI position of the current pixel position are major colors), pMax may be set to 〖Size〗_PLT-1. According to the escape color signaling in the current palette coding design, the escape color may be identified by checking if the decoded palette index at one pixel position is equal to the palette table size. Therefore, the decoded value of the current palette_index syntax element may determine the value of the next syntax element to be processed. One palette index may be decoded (e.g., only one palette index) after the palette index of its CPI position is completely reconstructed, for example, when the redundancy removal approach is used in palette index coding.

Syntax signaling dependencies of palette escape val may be provided. For an escape color position (e.g., for each escape color position of a CU), the color values of the position may be quantized (e.g., if lossy coding is used) and transmitted to a decoder. For example, escape colors may be present in a bitstream by signaling the syntax element palette_index (e.g., which is equal to 〖Size〗_PLT when the redundancy removal approach is not applied, and 〖Size〗_PLT-1 when the redundancy removal approach is applied) followed by another syntax element palette escape val, which may indicate the quantized color values (e.g., if lossy coding is used). The syntax palette_escape_val element may be signaled (e.g., only signaled) when one pixel is identified as an escape color as indicated by palette_index. Therefore, the value of a palette_index syntax element may determine what syntax element is to be processed. For example, if palette_index indicates the current pixel is an escape color, then the next syntax element may be palette_escape_val, and otherwise the next syntax element may be palette_run. Based on the same analysis of the syntax parsing dependencies of palette_index, one pixel may be (e.g., may only be) identified as an escape color after the palette index of its CPI position is fully reconstructed, for example, due to the redundancy removal process applied to palette index coding. Therefore, the syntax signaling dependency of escape colors may cause throughput issues.

Syntax signaling dependencies of palette_run may be provided. The syntax element palette_run may indicate the number of consecutive pixels with the same palette index in index mode and copy mode. The signaling of the syntax element palette_run may be signaled (e.g., only signaled) when one pixel is identified as a major color, which for example, may in contrast to palette_escape_val. Therefore, the similar syntax signaling dependency issue that is applicable to the element palette_escape_val may exist for the signaling of palette_run.

Palette table generation (e.g., at the encoder only) may be provided. One color-clustering-based palette table generation method may be used to select the major colors of one CU coded with palette mode by clustering the color values of the current CU into multiple sets and using the centroids of color clusters as the major colors in the palette table. In lossy coding, one color cluster may be generated by quantizing the pixels, for which the distortion between the color value and the centroid of the cluster may be a pre-defined threshold, to the same major color. This threshold may be set based on the assumption that the bit depths of luma and chroma components are equal to 8 bits. Therefore, the current palette table generation method may not properly handle the case when the bit depths of input screen content video are more than 8 bits.

One or more embodiments may address the conflicts for the combination of the extend copy mode and grouping palette indices at front. For example, the palette index coding bins may be grouped at the front of one palette CU. Palette indices (e.g., as specified by the syntax element palette_index_idc) may be binarized by TBC code for which the maximum possible level need to be known. The redundancy removal may not be applied to pixels whose CPI pixels make reference to NCPs. Therefore, different maximum TBC levels may be derived depending on the positions of pixels. For example, for pixels that refer to CPI pixels associated with the NCPs from the neighboring CU, the maximum TBC level pMax may be kept unchanged (e.g., the size of the palette table minus 1 when there is no escape color pixel in the current CU, or the size of the palette table when there is at least one escape color pixel in the current CU). For pixels that refer to CPI pixels not associated with NCPs from the neighboring CU, the maximum TBC level pMax may be reduced by 1. The parsing of the syntax palette_index_idc for one pixel may be dependent on the knowledge of the palette coding modes of the preceding pixels in the palette scan order. And, this knowledge may be acquired after decoding the palette coding modes (e.g., palette_run_type_flag) and palette runs (e.g., palette_run_msb_id_plus1 and palette_run_refinement_bits) for the preceding pixels of the current pixel. Therefore, when the extended copy mode is enabled, the parsing of the grouped palette indices may not be placed in front of the parsing of palette modes and palette runs.

A palette signaling method may reduce the maximum TBC level pMax by one, for example, in order to group palette indices at beginning of palette parsing process while enabling extended copy-above. The dynamic range of the palette indices for those pixels may be 0 to pMax, for example, since redundancy removal may not be applied to pixels whose CPI pixels refer to the NCPs from the neighboring CU. An additional flag may be signaled for those pixels (e.g., the pixels whose CPI pixels refer to the NCPs from the neighboring CU) when the corresponding parsed palette indices are equal pMax−1, for example, in order to compensate the reduced dynamic range of palette indices. If the flag is equal to 1, the palette index may be decoded to be pMax. If the flag is equal to 0, the palette index may be decoded to be pMax−1. For example, Table 3 is an example palette syntax table.

TABLE 3

Example Palette Syntax Table

| | Descriptor |
|---|---|
| palette_coding( x0, y0, nCbS ) { | |
| ... ... | |
|   if( indexMax > 0 ) { | |
|     palette_transpose_flag | ae(v) |
|     palette_num_indices | ae(v) |
|     for( i = 0; i < palette_num_indices; i++ ) { | |
|       palette_index_idc | ae(v) |
|       PaletteIndexIdc[i] = palette_index_idc | |
|     } | |
|     last_palette_run_type_flag | ae(v) |
|     NumIndicesLeft = palette_num_indices | |
|   } | |
|   scanPos = 0 | |
|   while( scanPos < nCbS * nCbS ) { | |
|     xC = x0 + travScan[ scanPos ][ 0 ] | |
|     yC = y0 + travScan[ scanPos ][ 1 ] | |
|     if( scanPos > 0) { | |
|       xcPrev = x0 + travScan[ scanPos − 1 ][ 0 ] | |
|       ycPrev = y0 + travScan[ scanPos − 1 ][ 1 ] | |
|     } | |
|     if( indexMax > 0 && (scanPos = = 0 \| \| | |
|       ( palette_run_type_flag[ xcPrev ][ ycPrev ] ! = | |
| COPY_ABOVE_MODE && | |
|       NumIndicesLeft && scanPos < nCbS * nCbS − 1 ) ) ) { | |
|       palette_run_type_flag[ xC ][ yC ] | ae(v) |
|     } | |
|     if( palette_run_type_flag[ xC ][ yC ] = = COPY_INDEX_MODE && | |
|       0indexMax > 1) { | |
|       if ( adjustedIndexMax = = indexMax − 1 && | |
| PaletteIndexIdc[palette_num_indices − NumIndicesLeft] = = (indexMax − 1) ) | |
|         palette_index_refinement_flag | ae(v) |
|       NumIndicesLeft −= 1 | |
|     } | |
|     if( indexMax > 0 && (NumIndicesLeft \| \| palette_run_type_flag != | |
|       last_palette_run_type_flag) ) { | |
|       maxPaletteRun = nCbS * nCbS − scanPos − 1 | |
|       if( maxPaletteRun > 0 ) { | |
|         palette_run_msb_id_plus1 | ae(v) |
|         if( palette_run_msb_id_plus1 > 1 ) | |

TABLE 3-continued

Example Palette Syntax Table

| | Descriptor |
|---|---|
| ```
            palette_run_refinement_bits
          }
      } else
        paletteRun = nCbS * nCbS - 1 - scanPos
      runPos = 0
      while ( runPos <= paletteRun ) {
        xR = x0 + travScan[ scanPos ][ 0 ]
        yR = y0 + travScan[ scanPos ][ 1 ]
        if( palette_run_type_flag[ xC ][ yC ] = = COPY_INDEX_MODE &&
          paletteIndex = = indexMax ) {
          PaletteSampleMode[ xR ][ yR ] = ESCAPE_MODE
          PaletteIndexMap[ xR ][ yR ] = paletteIndex
          for( cIdx = 0; cIdx < 3; cIdx++ ) {
            palette_escape_val
            PaletteEscapeVal[ cIdx ][ xR ][ yR ] = palette_escape_val
          }
        } else if(palette_run_type_flag[ xC ][ yC ] = = COPY_INDEX_MODE
) {
          PaletteSampleMode[ xR ][ yR ] = COPY_INDEX_MODE
          PaletteIndexMap[ xR ][ yR ] = paletteIndex
        } else {
          PaletteSampleMode[ xR ][ yR ] = COPY_ABOVE_MODE
          PaletteIndexMap[ xR ][ yR ] = (yR - 1) < y0 ?
            (bNeighbour ? NCP_INDEX :0) :PaletteIndexMap[ xR ][ yR - 1 ]
        }
        runPos++
        scanPos++
      }
    }
}
``` | ae(v)<br><br><br><br><br><br><br><br>ae(v) |

One or more embodiments may address the unknown TBC maximum problem when combining the extended copy-above mode with grouping indices at front. The syntax element palette_index_refinement_flag may be coded as bypass bins and/or interleaved with the syntax elements of signaling palette mode and palette runs, which may be context-coded. To parse the value of palette_index_refinement_flag, a decoder may check whether the current pixel has one CPI position that refers to the pixels from the neighboring CU and/or whether the palette index parsed previously is equal to pMax−1 or not.

A coding mode sketch copy mode is proposed to code blocks comprising irregular lines. Syntax redundancy may be removed from blocks with special characteristics. The run value coding may be simplified. The parsing dependencies in the current palette coding design may be removed. For example, the context modeling dependency of the syntax element palette_transpose_flag may be removed, for example, by simplifying the corresponding context model. The context modeling of the syntax element palette_mode may be removed, for example, by using run-length coding without using context. The syntax parsing dependencies and/or the syntax signaling dependencies that are related with escape color signaling may be removed. A palette table generation process may handle input screen content video with high bit depths, for example, at the encoder side.

Sketch copy mode for palette coding may be provided. Sketch copy mode may be performed by copying a palette index from a coded neighboring sample position in one or more directions (e.g., which may include diagonals of any sort, horizontal, and/or vertical directions). Sketch copy mode may allow pixel copying in one or more specific directions. Coded irregular lines (e.g., diagonal lines) may be considered during the counting of a run. One or more (e.g., three) syntax elements may be coded for sketch mode: color index, direction, and/or run. The color index may be an index in the palette table and/or be equal to the size of palette table to indicate an escape color. The direction information may be coded following the color index. A run value may be coded to indicate the number pixels having the same color index as first pixel in that signaled direction.

Figure 8A:
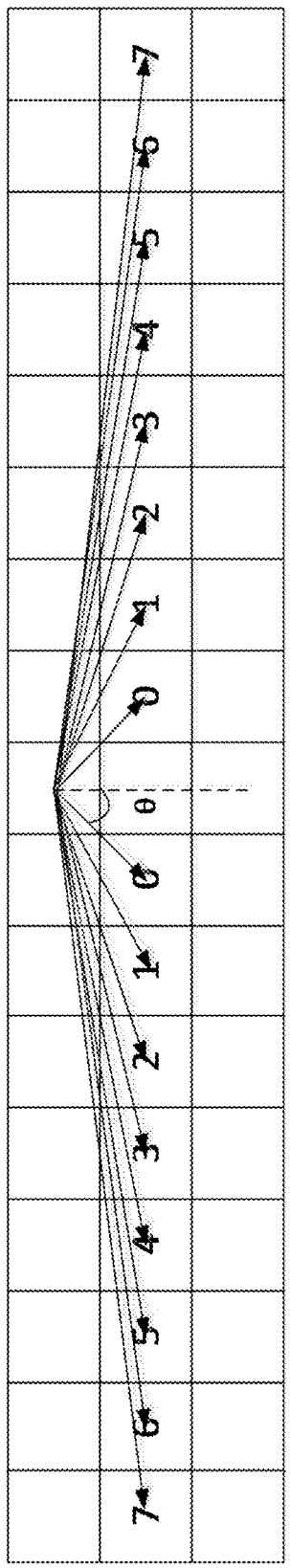
FIG. 8A is a diagram illustrating an example of 16 directions with course granularity.
Figure 8B:
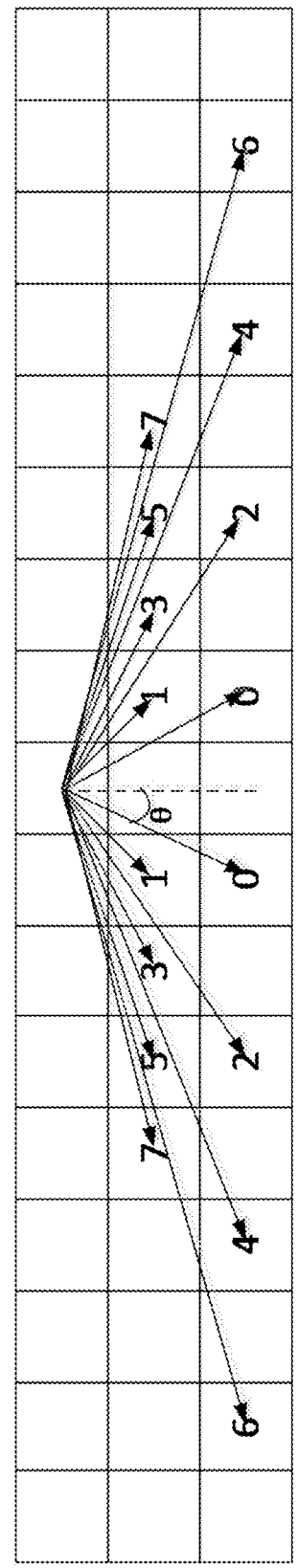
FIG. 8B is a diagram illustrating an example of 16 directions with fine granularity.

The directions to be coded may be defined. FIG. 8A is a diagram illustrating an example of 16 directions with course granularity. FIG. 8B is a diagram illustrating an example of 16 directions with fine granularity. FIG. 8A and FIG. 8B illustrate example definitions for 16 directions in different granularities, where each side may have eight directions respectively. The directions in FIG. 8A may be defined as follows:

$$\theta_i = \tan^{-1}(x_i), x_i = \{1, 2, \ldots, 8\}$$

The directions defined in FIG. 8B may be in a fine granularity, and the directions may be defined as follows:

$$\theta_i = \tan^{-1}(x_i), x_i = \{\frac{1}{2}, 1, \ldots, 4\}$$

Figure 9:
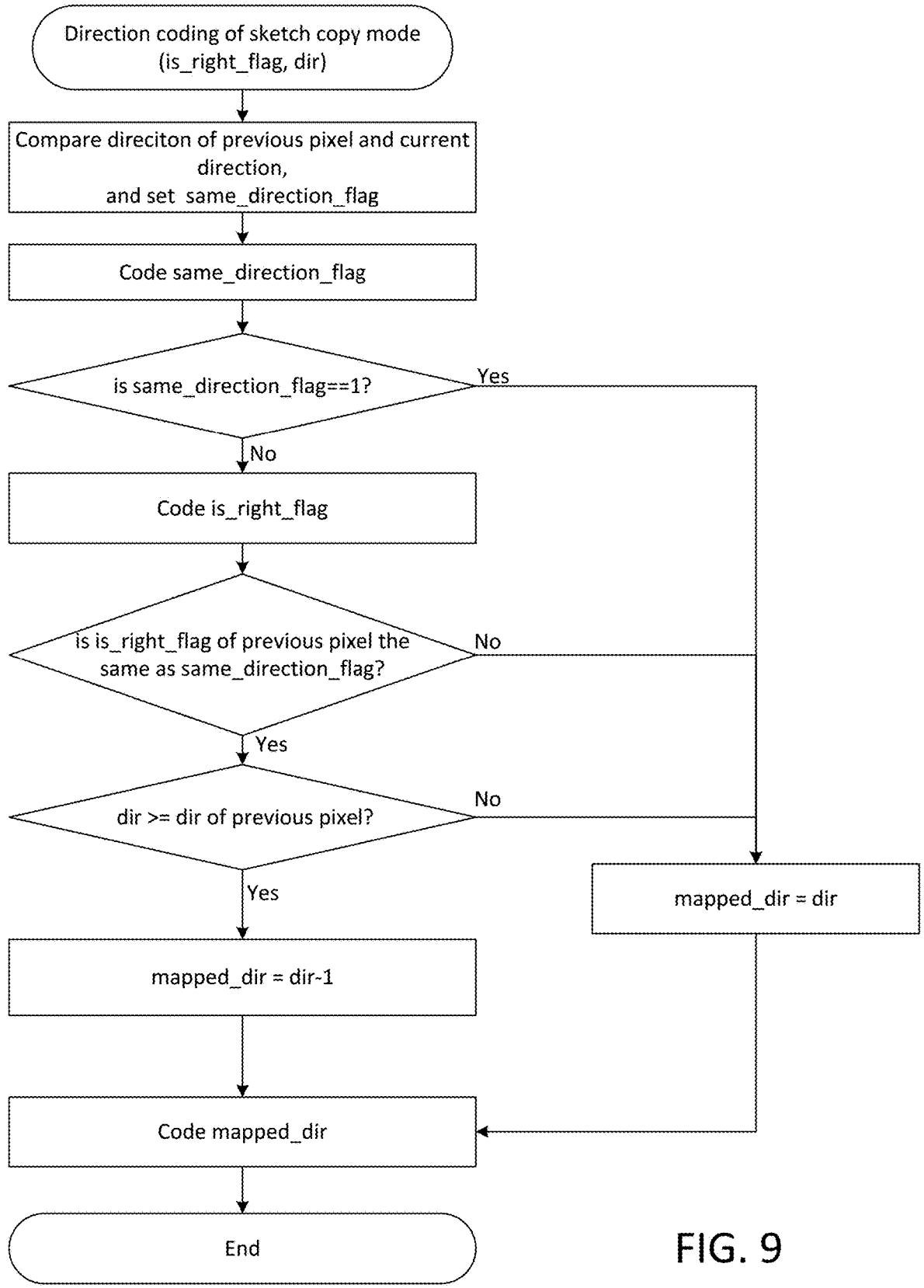
FIG. 9 is a diagram illustrating an example flow chart of the direction coding algorithm for sketch copy mode.

The vertical direction may not be considered in a sketch copy mode, for example, because index mode in a vertical traverse scan may code a vertical line efficiently. The number of directions may be reduced if the overhead for direction coding affects performance, for example, at low bitrate coding. The direction information may be segmented into one or more elements, for example, a flag "is_right_flag" and the index of direction at one side. "is_right_flag" may be used to indicate which side the direction belongs to. A maximum index of a direction may be equal to a plurality of different directions, for example, seven different directions (e.g., to each side) as provided by the examples of FIG. 8A and FIG. 8B. The direction of a previous coded neighboring pixel may be considered, for example, to further remove the redundancy of direction coding. If a current pixel has the same direction compared to the direction of a previous coded neighboring pixel, then a flag "same_direction_flag" may be coded (e.g., only the flag "same_direction_flag" is coded). If directions are not the same but they have the same value as "is_right_flag", then the pruning process may be performed. FIG. 9 is a diagram illustrating an example flow chart of the direction coding algorithm for sketch copy mode.

Figure 10:
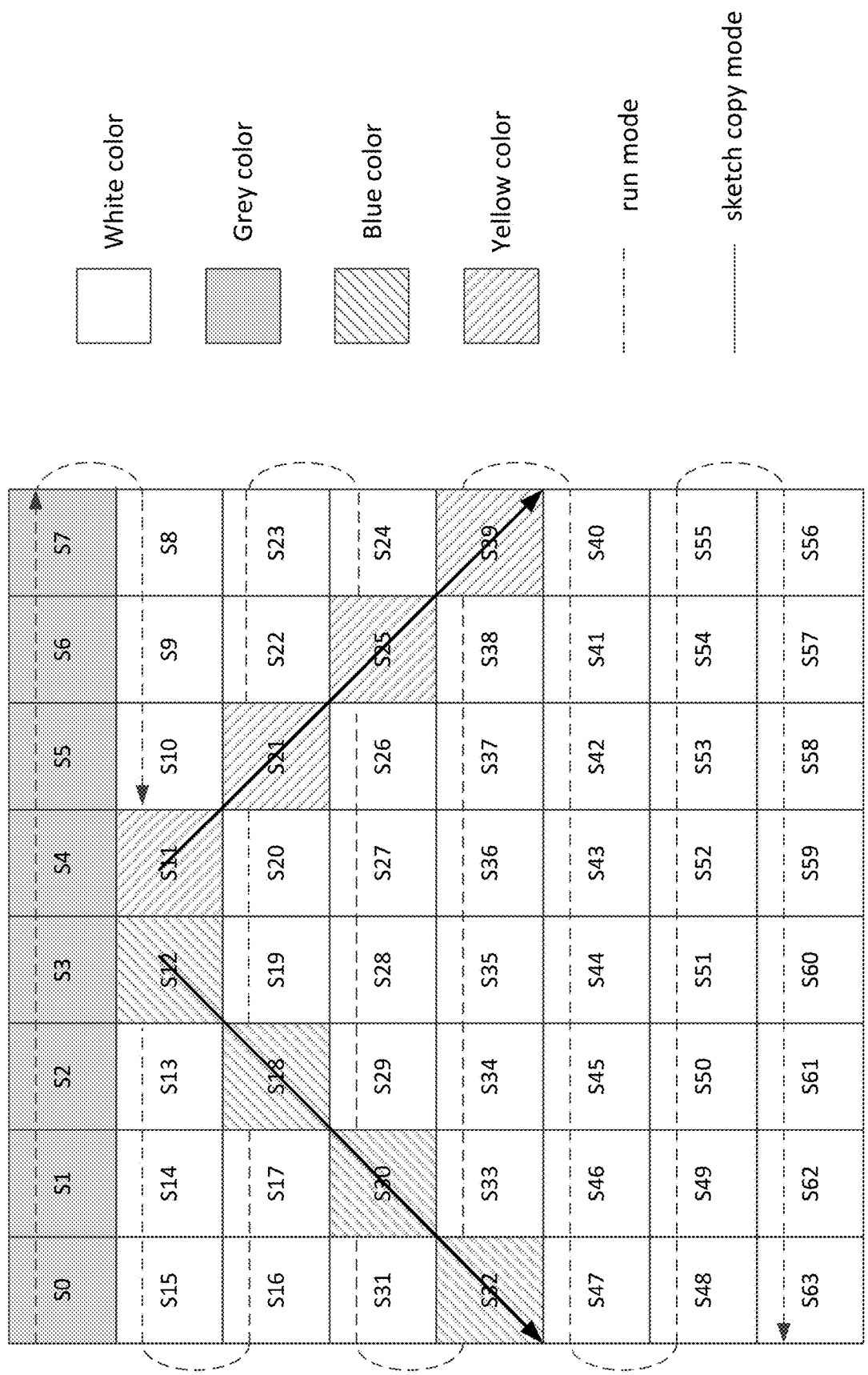
FIG. 10 is a diagram illustrating an example of palette coding with sketch copy mode.

FIG. 10 is a diagram illustrating an example of palette coding with sketch copy mode. FIG. 10 may be compared to the palette coding in FIG. 7B. The irregular lines may be coded with sketch mode. At the position S11, the irregular line (e.g., the diagonal line going from S11 to S39) may be coded by a sketch mode with a run value being equal to three. The is_right_flag may be set to 1 and the direction index may be 0. At the position S12, the irregular line (e.g., the diagonal line going from S12 to S32) may be coded by a sketch mode with a run being equal to three. The is_right_flag may be set to 0 and the direction index may be 0. After position S12, an index mode may code the remaining pixels in the block. Five runs may be coded in total, for example, because the irregular lines are not included. The number of segments in that block may be reduced by enabling sketch copy mode.

The block prone to apply palette coding may include a plurality of colors. Sketch copy mode may be applied (e.g., only applied) for blocks that include one or more irregular lines. If there are no irregular lines within the block, then sketch copy mode may not be selected though, for example, it may be enabled. The signaling overhead for run and copy mode may be increased due to one or more additional modes added. Therefore, the usage of sketch copy mode may be restricted to reduce the signaling overhead. A flag may be added in the coding unit coded with a palette to indicate whether the sketch copy mode is enabled or not. For example, if it is not enabled, then no signaling overhead is added. The applications of sketch copy mode may be limited, for example, sketch copy mode may be used within one block because sketch copy mode will not save too much if there are not many pixels remaining. Sketch copy mode may not save signaling overhead for remaining pixel coding, for example, if the coding position is beyond the specific row defined by a threshold. The threshold may be adaptive to the size of a coding unit. For example, the threshold may be [4, 7, 12, 16] for 8×8, 16×16, 32×32, and/or 64×64 coding units.

Figure 11C:
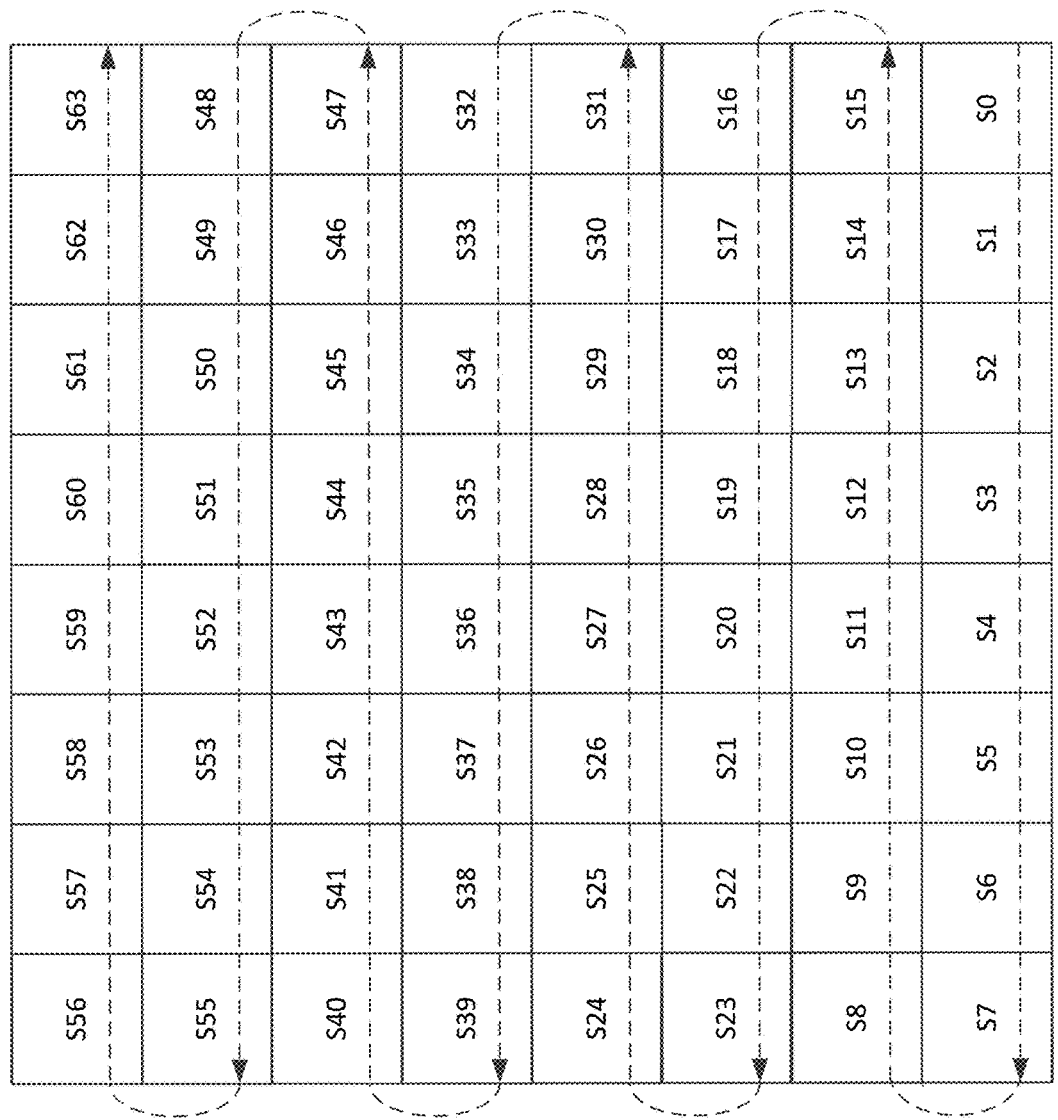
FIG. 11C illustrates an example of a coding order in a reverse horizontal traverse scan.
Figure 11D:
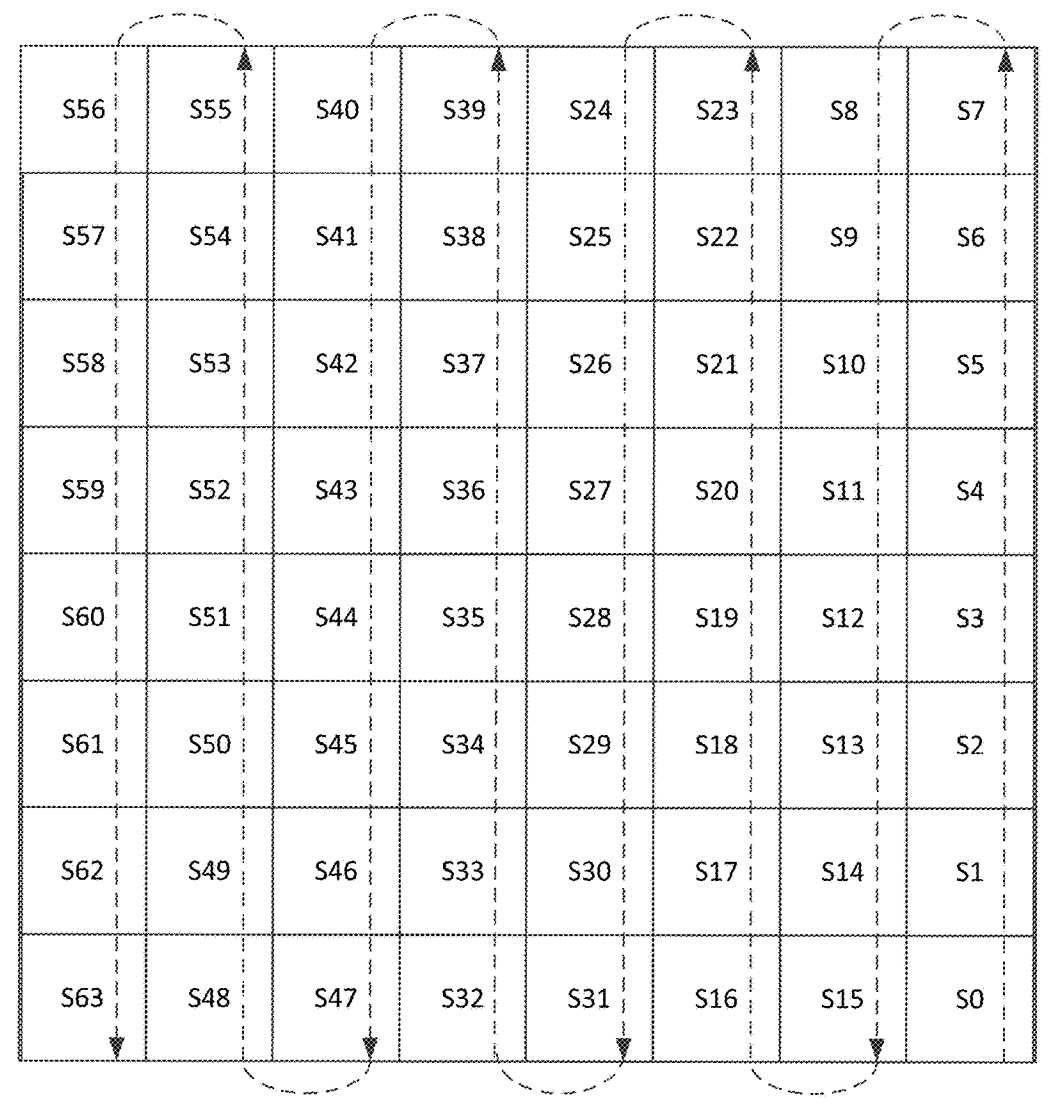

The scanning method may be extended. FIG. 11A and FIG. 11B illustrate examples of a coding order of a horizontal traverse scan and a vertical traverse scan, respectively. The horizontal traverse scan and/or the vertical traverse scan may be performed in a reverse order, which for example, may be equivalent to the block being rotated by 180 degrees in a clock-wise or counter clock-wise manner. FIG. 11C and FIG. 11D illustrate examples of a coding order in a reverse horizontal traverse scan and in a reverse vertical traverse scan, respectively.

Redundancy removal for palette table syntax elements may be provided. The syntax element palette_escape_val_present_flag may be used to indicate whether an escape color exists in a coding unit (CU). The escape color may be signaled with the color index being equal to the palette table size. If there is no escape color, then the maximum color index may be equal to palette table size minus one. Otherwise, the maximum color index may be equal to palette table size. This maximum value may affect the color index coding, for example, because the color index may be coded with truncated binary code. The number of bits for a variable x in truncated binary code may be provided by the following:

$$\text{length}(x) = \begin{cases} n-1, & \text{if } x < 2^n - M \\ n, & \text{if } x \geq 2^n - M \end{cases}; x \in [0, M), n = \lceil \log 2(M) \rceil$$

where M is the maximum value of variable x plus one. From the equation above, it may be determined that additional values may be coded with (n−1) bits with a smaller M. The element palette_escape_val_present_flag may not be signal, for example, to remove palette signaling redundancy. When the palette table size for a CU is 0 (e.g., the palette table is empty), the decoder may determine that all pixels are escape colors (e.g., there are no major colors in the palette table). As such, when the palette table size for a CU is 0, the palette_escape_val_present_flag may not be signaled and the decoder may infer the value to be 1. When the palette table size is a value other than 0, then the palette_escape_val_present_flag may be signaled. Therefore, the palette_escape_val_present_flag may be signaled (e.g., only signaled) when the palette table size is a value other than 0. If there is one color (e.g., only one color) in the coding unit (e.g., the palette table size is 1 and palette_escape_val_present_flag is 0) or if all pixels are coded as escape colors (e.g., palette table size is 0 and palette_escape_val_present_flag is 1), then the palette mode may be in index mode (e.g., may be inferred to be in index mode (e.g., run mode)) and the run value may be the size of coding unit minus 1 if run is coded. For example, if there is one color (e.g., only one color) in the coding unit (e.g., the palette table size is 1 and palette_escape_val_present_flag is 0), then the decoder may not receive palette_mode and/or may infer palette_mode to be equal to 0 (e.g., inferred to be in index mode (e.g., run mode)) and/or may not receive palette_run and/or may infer palette_run to be equal to the size of the CU minus 1. A condition may be added for palette mode signaling and/or run coding, for example, as shown in Table 6.

The entropy coding of the syntax element Run in palette coding may be provided. Two different codes may be used to code the syntax element Run. Table 4 is an example of a binarization of the value of Run. There may be three segments for the whole range of Run. The first one, two, or three digits of the bin may be context coded (e.g., those illustrated in bold in Table 4), and the subsequent digits in the bin may be by-pass coded without any context (e.g., those illustrated as not in bold in Table 4). 0 to 2 may be the first segment coded with fixed context for each bin. 3 to 26 may be the second segment. The coding of prefix may be the same as segment 1, and the suffix may be coded with Golomb-Rice codes and/or the rice parameter may be equal to 3. A value beyond 26 may be a third segment. The prefix of the third segment may be coded the same as segment 1. The suffix may be coded with Exp-Golomb codes. Run values from 3 to 10, 3 prefix bins, and/or 4 suffix bins may be coded. A second order Exp-Golomb may be provided for values beyond 2. An example binarization may be provided in Table 5. For small runs, the number of bins may be reduced.

TABLE 4

Example Binarization of Run value (e.g., in SCC)

| Run | Bin | |
|---|---|---|
| 0 | 0 | Segment1 |
| 1 | 10 | |
| 2 | 110 | |

TABLE 4-continued

Example Binarization of Run value (e.g., in SCC)

| Run | Bin | |
|-----|-----|---|
| 3   | 111 0000 | Segment2: prefix "111" + suffix |
| ... | 111 0xxx | Golomb-Rice code with rice parameter |
| 11  | 111 10000 | equal to 3 |
| ... | 111 10xxx | |
| 19  | 111 110000 | |
| ... | 111 110xxx | |
| 27  | 111 1110000 | Segment3: prefix "111" + suffix |
| ... | 111 1110xxx | Exp-Golomb code |
| 35  | 111 111100000 | |
| ... | 111 11110xxxx | |

TABLE 5

Example Binarization of Run value

| Run | Bin | |
|-----|-----|---|
| 0   | 0   | Segment1 |
| 1   | 10  | |
| 2   | 110 | |
| 3   | 111 000 | Segment2: prefix "111" + $2^{nd}$ order |
| ... | 111 0xx | Exp-Golomb code |
| 7   | 111 10000 | |
| ... | 111 10xxx | |
| 15  | 111 1100000 | |
| ... | 111 110xxxx | |
| 31  | 111 111000000 | |
| ... | 111 1110xxxxx | |
| 63  | 111 11110000000 | |
| ... | 111 11110xxxxxx | |

Parsing dependency improvement for palette coding may be provided. Removing the context modeling dependency of the syntax element "palette_transpose_flag" may be provided. One or more (e.g., two context models) may be used to code the syntax element palette_transpose_flag. One context model may be selected for palette_transpose_flag, for example, based on whether the palette indices of the left neighboring CU of the current CU are scanned horizontally or vertically. This could complicate parallelism design for practical implementation as the bit-streams of two neighboring palette-coded CUs may not be parsed simultaneously. This neighbor-based context modeling may use one binary buffer to store the value of the syntax element for the left neighboring CU. The palette_transpose_flag flag may be the CU-level flag that establishes its context models using its spatial neighbors, for example, while the other CU-level flags (e.g., such as palette_share_flag, palette_escape_val_present_flag, num_signalled_palette_entries, and/or the like) may be coded in bypass mode and/or coded in context mode, using one single context.

The context modeling dependency of the syntax element palette_transpose_flag on the left neighbor of the current CU may be removed, for example, by coding the flag with one single context. This may be performed to improve parallelism capacity and/or to make CU-level signaling design of palette coding more consistent.

The syntax element palette_transpose_flag may be coded in bypass mode.

The context modeling dependency of the syntax element "palette_mode" may be removed. One or more context models may be used to code the palette_mode flag, which may be determined based on the value of the same syntax element of the collocated pixel in the above row. Table 6 illustrates an example of the context modeling used to code the palette_mode flag. In the index mode and/or the copy mode, palette_mode may be decoded for each run-length chain of consecutive pixels with the same palette index. Correspondingly, this context modeling approach may reduce the throughput of the parsing process, as the determination of the context at one pixel may be dependent on the palette index coding mode of pixels preceding it in the scan order.

TABLE 6

Example of context modeling of the syntax element palette_mode

| Condition | Context index |
|-----------|---------------|
| The above pixel is coded in index mode or escape color | 0 |
| The above pixel is coded in copy-above mode | 1 |

The flags palette mode of one CU may form a binary vector which may be composed of elements "0" and "1." Run length coding (RLE) is method of coding binary vector by indicating the number of consecutive 0's between two 1's. RLE may be used for applications that require high throughput, for example, because multiple bins can be generated together within one single circle. For example, to remove the context modeling of palette_mode, RLE may be used to code the syntax element palette_mode.

The context modeling dependency of the syntax element palette_mode may be removed by coding the flag with a single context.

The syntax parsing and/or signaling dependencies related with escape color signaling may be removed. There may be syntax parsing dependencies and syntax signaling dependencies associated with the signaling of escape colors when parsing the syntax elements palette_index, palette_escape_val and palette_run, for example, due to the TBC-based binarization and the redundancy removal algorithm that are applied to palette index coding. The parsing dependencies may be removed, for example, for a higher throughput and/or to improve the efficiency of palette coding.

The palette index used for escape colors may not be coded in index mode or in copy mode, for example, although the current palette coding method may use the maximum palette index to indicate escape colors. For example, one run-length chain of consecutive pixels with the same palette index may be broken when an escape color is encountered. This may compromise the overall coding efficiency of palette coding and/or introduce dependencies to the parsing process for CUs coded with palette mode. After the redundancy removal algorithm is applied, the palette index of one pixel may be parsed after the palette index of its CPI position is fully reconstructed (e.g., in order to check if the CPI position is coded as escape color or not, which may determine the input parameter pMax for the TBC binarization process).

The palette index used to indicate escape colors may be used as one normal palette index and it may be coded using an index mode and/or a copy mode. For example, a decoder may parse palette index run values of a CU. The palette index run values may indicate a length of consecutive palette indices for corresponding pixel positions in the CU. One or more of the palette indices may correspond to an escape color. For example, the palette indices may correspond to a plurality of different escape values. As such, a run of escape colors (e.g., which may be the same or different escape colors) may be coded in index mode and/or copy mode. For example, color values for the different pixel positions of a CU may be encoded according to one or more runs, which may include one or more runs of a major color and/or one or more runs of escape colors. A run of escape colors may be a run of the same escape color or different escape colors. The decoder may reconstruct the consecutive palette indices for the corresponding pixel positions of the CU according to the palette index run values (e.g., which may be a run of escape colors). The decoder may reconstruct the color values for the pixel positions of the CU according to the palette indices and/or one or more palette_escape_val values. The parsing of the syntax element palette_escape_val may be separated from that of the other syntax elements, for example, in order to remove the syntax signaling dependencies of the element palette_escape_val. For example, one or more scan passes may be applied to parse the syntax elements of one palette-coded CU. For example, a scan pass (e.g., a first scan pass) may parse the existing palette syntax elements except palette_escape_val. A scan pass (e.g., a second scan pass) may parse the syntax element palette_escape_val, for example, based on the decoded palette indices from the first scan pass. In the second scan pass, palette_escape_val may be parsed for one pixel position when its palette index, as derived by the first passes, is equal to the palette table size of the current CU (e.g., the escape color).

The syntax parsing dependency of palette index may be removed. The maximum palette index pMax may be used with a fixed value (e.g., the maximum of palette table size) as the input to the TBC binarization process for palette index coding. To remove the syntax signaling dependencies of the elements palette_escape_val and palette_run on escape colors, the redundancy removal method for escape colors may be removed.

Improved palette table generation for high bit-depth may be provided. A color-clustering-based palette table generation method may be used to select the major colors of one CU coded with palette mode by clustering the color values of the current CU into multiple sets and using the centroids of color clusters as the major colors in the palette table. In lossy coding, one color cluster may be generated by quantizing the pixels (e.g., all the pixels) for which the distortion between the color value and the centroid of the cluster is no more than a pre-defined threshold T, to the same major color, for example, as illustrated by the following:

$$C = \left\{ P : \sum_{i=0}^{2} |P_i - C_i| \leq T \right\}$$

where P_i and C_i may represent the values of the i-th component of the current pixel and the centroid of the cluster, respectively. The threshold T may be set dependent upon a quantization parameter. Table 7 illustrates an example of a mapping between the values of T and the quantization parameters.

TABLE 7

Example mapping between quantization parameter (QP) and threshold T (e.g., in SCM-2.0)

| QP | 0 | 1 | 2 | 3 | 4 | 5 | 6 | 7 | 8 | 9 | 10 | 11 | 12 |
|----|---|---|---|---|---|---|---|---|---|---|----|----|----|
| T | 0 | 0 | 0 | 0 | 1 | 1 | 1 | 2 | 2 | 2 | 3 | 3 | 3 |
| QP | 13 | 14 | 15 | 16 | 17 | 18 | 19 | 20 | 21 | 22 | 23 | 24 | 25 |
| T | 4 | 4 | 4 | 5 | 5 | 5 | 6 | 6 | 7 | 7 | 8 | 9 | 9 |
| QP | 26 | 27 | 28 | 29 | 30 | 31 | 32 | 33 | 34 | 35 | 36 | 37 | 38 |
| T | 10 | 11 | 12 | 13 | 14 | 15 | 16 | 17 | 19 | 21 | 22 | 24 | 23 |
| QP | 39 | 40 | 41 | 42 | 43 | 44 | 45 | 46 | 47 | 48 | 49 | 50 | 52 |
| T | 25 | 26 | 28 | 29 | 31 | 32 | 34 | 36 | 37 | 39 | 41 | 42 | 45 |

In Table 7, the values of the threshold T may be determined assuming that the input bit depths of luma and chroma components are 8 bits. Therefore, the palette table by the current palette table generation method may not properly handle the case when the bit depths of input screen content video are more than 8 bits. In order to improve the coding efficiency of palette coding for high bit depths, the 8-bit distortion may be used for the palette table generation process. The bit depths of luma and chroma components may be denoted as BitDepq_Y and (BitDepth)_C, and the distortion calculation equation may be as follows:

$$C = \left\{ P : \sum_{i=0}^{2} (|P_i - C_i| >> (BitDepth_i - 8)) \leq T \right\}$$

Table 8 illustrates an example of syntax that may be used to enable the syntax redundancy removal method described herein and/or to remove the parsing dependencies as described herein.

TABLE 8

Example of Palette coding syntax

| | Descriptor |
|---|---|
| palette_coding( x0, y0, nCbS ) { | |
|   palette_transpose_flag | ae(v) |
|   palette_share_flag[ x0 ][ y0 ] | ae(v) |
|   if( palette_share_flag[ x0 ][ y0 ] ) { | |
|     palette_size = previousPaletteSize | |
|     for( n = 0; n < palette_size; n++ ) | |
|       for( cIdx = 0; cIdx < 3; cIdx++ ) | |
|         palette_entries[ cIdx ][ n ] = previousPaletteEntries[ cIdx ][ n ] | |
|   } else { | |
|     numPredPreviousPalette = 0 | |
|     for( i = 0; i < previousPaletteStuffingSize; i++ ) | |
|       previous_palette_entry_flag[ i ] = 0 | |
|     palette_last_group = 0 | |
|     for( i = 0; i < previousPaletteStuffingSize && !palette_last_group && | |
|       numPredPreviousPalette < max_palette_size; i++ ) { | |
|       lastPossibleGroupFlag = ( i + 4 >= previousPaletteStuffingSize ) | |
|       lastIdx = min( i + 4, previousPaletteStuffingSize ) − 1 | |
|       if( i > 3 && !lastPossibleGroupFlag ) | |
|         palette_all_zeros_in_group | ae(v) |

TABLE 8-continued

Example of Palette coding syntax

| | Descriptor |
|---|---|
|     Else<br>     palette_all_zeros_in_group = 0<br>    if( palette_all_zeros_in_group )<br>     i += 4<br>    else {<br>     numOnesInGroup = 0<br>     for( idx = i; idx <= lastIdx && numPredPreviousPalette < max_palette_size;<br>      idx++ ) {<br>      if ( idx == lastIdx && numOnesInGroup == 0 )<br>       previous_palette_entry_flag[ idx ] = 1<br>      Else<br>       previous_palette_entry_flag[ idx ] | ae(v) |
|       if ( previous_palette_entry_flag[ idx ] ) {<br>       for ( cIdx = 0; cIdx < 3; cIdx++ )<br>        palette_entries[ cIdx ][ numPredPreviousPalette ] =<br>         previousPaletteEntries[ cIdx ][ idx ]<br>       numPredPreviousPalette++<br>       numOnesInGroup++<br>      }<br>     }<br>     if( !palette_all_zeros_in_group &&<br>      !lastPossibleGroupFlag && numPredPreviousPalette < max_palette_size )<br>      palette_last_group | ae(v) |
|     }<br>  }<br>  if( numPredPreviousPalette < max_palette_size)<br>   num_signalled_palette_entries | ae(v) |
|   for( cIdx = 0; cIdx < 3; cIdx++ )<br>   for( i = 0; i < num_signalled_palette_entries; i++ )<br>    palette_entries[ cIdx ][ numPredPreviousPalette + i ] | ae(v) |
|   palette_size = numPredPreviousPalette + num_signalled_palette_entries<br>}<br>if(palette_size >0)<br> palette_escape_val_present_flag | ae(v) |
| if( palette_escape_val_present_flag )<br> indexMax = palette_size<br>Else<br> indexMax = palette_size − 1<br>scanPos = 0<br>while( scanPos < nCbS * nCbS ) {<br> xC = x0 + travScan[ scanPos ][ 0 ]<br> yC = y0 + travScan[ scanPos ][ 1 ]<br> if( scanPos > 0) {<br>  xC_prev = x0 + travScan[ scanPos − 1 ][ 0 ]<br>  yC_prev = y0 + travScan[ scanPos − 1 ][ 1 ]<br> }<br> if(indexMax>0 && scanPos >= nCbS &&<br>palette_mode[xC_prev][yC_prev] != COPY_ABOVE )<br>  palette_mode[ xC ][ yC ] | ae(v) |
|  if( palette_mode[ xC ][ yC ] != COPY_ABOVE ) {<br>  adjustedIndexMax = indexMax<br>  adjustedRefIndex = indexMax + 1<br> }<br> if( scanPos > 0) {<br>  if( palette_mode[xC_prev][yC_prev] == INDEX ) {<br>   adjustedIndexMax −= 1<br>   adjustedRefIndex = paletteMap[ xC_prev ][ yC_prev ]<br>  }<br>  if( scanPos >= nCbS && palette_mode[ xC_prev ][yC_prev ] == COPY_ABOVE<br>   ) {<br>   adjustedIndexMax −= 1<br>   adjustedRefIndex = paletteMap[ xC ][ yC − 1 ]<br>  }<br> }<br> if( palette_mode[ xC ][ yC ] != COPY_ABOVE ) {<br>  if( adjustedIndexMax > 0 )<br>   palette_index | ae(v) |
|  } | |

TABLE 8-continued

Example of Palette coding syntax

| | Descriptor |
|---|---|
| ```
    if( indexMax>0 ) {
      palette_run
      runPos = 0
      runMode = palette_mode[ xC ][ yC ]
      while ( runPos < = palette_run ) {
        xC = x0 + travScan[ scanPos ][ 0 ]
        yC = y0 + travScan[ scanPos ][ 1 ]
        if( palette_mode[ xC ][ yC ] = = INDEX ) {
          palette_mode[ xC ][ yC ] = INDEX
          paletteMap[ xC ][ yC ] = palette_index
        } else {
          palette_mode[ xC ][ yC ] = COPY_ABOVE
          paletteMap[ xC ][ yC ] = paletteMap[ xC ][ y − 1 ]
        }
        runPos++
        scanPos++
      }
    }
  }
  scanPos = 0
  while( scanPos < nCbS * nCbS ) {
    xC = x0 + travScan[ scanPos ][ 0 ]
    yC = y0 + travScan[ scanPos ][ 1 ]
      if( palette_index[xC][yC] = = palette_size ) {
        for( cIdx = 0; cIdx < 3; cIdx++ ) {
          palette_escape_val
          paletteEscapeVal[ cIdx ][ xC ][ yC ] = palette_escape_val
        }
      }
      scanPos++
  }
  tempPaletteEntries[ cIdx ][ i ] = palette_entries[ cIdx ][ i ]
  for( i = 0; i < previousPaletteStuffingSize && current_size <
max_palette_predictor size;
      i++ )
      if( previous_palette_entry_flag[ i ] = = 0 ) {
        for ( cIdx = 0; cIdx < 3; cIdx++ )
          tempPaletteEntries[ cIdx ][ current_size ] =
previousPaletteEntries[ cIdx ][ i ]
        current_size++
      }
    previousPaletteStuffingSize = current_size
    previousPaletteEntries = tempPaletteEntries
}
``` | ae(v)<br><br><br><br><br><br><br><br><br><br><br><br><br><br><br><br><br><br><br><br><br><br>ae(v) |

One or more embodiments may comprise parsing throughput for extended copy mode. The parsing of the grouped palette indices may not be placed in front of the parsing of palette modes and palette runs, for example, when the extended copy mode is enabled. One or more embodiments may be provided that increase the parsing throughput, and which may be jointly applied with extended copy mode.

The palette indices may be grouped together and placed after the palette modes and palette runs (e.g., as compared to placing the indices before the modes and runs). Escape colors may be separated and placed after palette indices. For example, the following palette syntax arrangement may be used. The syntax elements related with palette modes and palette runs (e.g., which may include palette_run_type_flag, palette_run_msb_id_plus1, palette_run_refinement_bits and/or the like) may be placed in the current CU (e.g., first in the current CU). One or more (e.g., all) of the palette indices (e.g., palette_index_idc) for one or more (e.g., all) of the pixels that are coded by index mode may be placed after the syntax elements related to palette modes and palette runs. One or more (e.g., all) of the escape colors (e.g., palette_escape_val) for one or more (e.g., all) of the pixels that are coded as escape colors may be placed after the palette indices of the pixels. Table 9 illustrates an example of a palette syntax table with this arrangement.

TABLE 9

Example Palette coding syntax

| | Descriptor |
|---|---|
| ```
palette_coding( x0, y0, nCbS ) {
  ... ...
    scanPos = 0
    while( scanPos < nCbS * nCbS ) {
      xC = x0 + travScan[ scanPos ][ 0 ]
      yC = y0 + travScan[ scanPos ][ 1 ]
``` | |

TABLE 9-continued

Example Palette coding syntax

| | Descriptor |
|---|---|
| ```
    if( scanPos > 0 ) {
      xcPrev = x0 + travScan[ scanPos − 1 ][ 0 ]
      ycPrev = y0 + travScan[ scanPos − 1 ][ 1 ]
    }
    if( indexMax > 0 && scanPos > = nCbS &&
palette_run_type_flag[ xcPrev ][ ycPrev ]
      ! = COPY_ABOVE_MODE ) {
      palette_run_type_flag[ xC ][ yC ]
    }
    if( indexMax > 0 ) {
      maxPaletteRun = nCbS * nCbS − scanPos − 1
      if( maxPaletteRun > 0 ) {
         palette_run_msb_id_plus1
         if( palette_run_msb_id_plus1 > 1 )
            palette_run_refinement_bits
      }
    } else
      paletteRun = nCbS * nCbS − 1
    scanPos = scanPos + paletteRun + 1
  }
  scanPos = 0
  while( scanPos < nCbS * nCbS ) {
    xC = x0 + travScan[ scanPos ][ 0 ]
    yC = y0 + travScan[ scanPos ][ 1 ]
    if( palette_run_type_flag[ xC ][ yC ] = = COPY_INDEX_MODE &&
       adjustedIndexMax > 0)
      palette_index_idc
    runPos = 0
    scanPosC = scanPos
    while ( runPos < = PaletteRun[travScan[ scanPosC ][ 0 ]][
travScan[ scanPosC ][ 1 ]] ) {
      xR = x0 + travScan[ ScanPos ][ 0 ]
      yR = y0 + travScan[ ScanPos ][ 1 ]
      if(palette_run_type_flag[ xC ][ yC ] = = COPY_INDEX_MODE ) {
         PaletteSampleMode[ xR ][ yR ] = COPY_INDEX_MODE
         PaletteIndexMap[ xR ][ yR ] = PaletteIndex
      } else {
         PaletteSampleMode[ xR ][ yR ] = COPY_ABOVE_MODE
         PaletteIndexMap[ xR ][ yR ] = PaletteIndexMap[ xR ][ yR − 1 ]
      }
      runPos++
      scanPos++
    }
  }
  scanPos = 0
  while( scanPos < nCbS * nCbS ) {
    xC = x0 + travScan[ scanPos ][ 0 ]
    yC = y0 + travScan[ scanPos ][ 1 ]
    if( PaletteIndexMap[ xC ][ yC ] = =
       IndexMax && palette_escape_val_present_flag ) {
      PaletteSampleMode[ xC ][ yC ] = ESCAPE_MODE
      for( cIdx = 0; cIdx < 3; cIdx++ ) {
         palette_escape_val
         PaletteEscapeVal[ cIdx ][ xR ][ yR ] = palette_escape_val
      }
    }
  }
}
``` | ae(v)<br><br><br><br>ae(v)<br>ae(v)<br><br><br><br><br><br><br><br><br>ae(v)<br><br><br><br><br><br><br><br><br><br><br><br><br><br><br><br><br><br><br><br>ae(v) |

The palette runs may be coded by the HEVC SCC run coding method. One or more of the run coding methods described herein may be combined with one or more of the described embodiments. For example, Table 10 is an example of a palette syntax that has an arrangement described above with run-to-end coding included.

TABLE 10

Example of palette coding syntax

| | Descriptor |
|---|---|
| ```
palette_coding( x0, y0, nCbS ) {
  ... ...
    scanPos = 0
    while( scanPos < nCbS * nCbS ) {
``` | |

TABLE 10-continued

Example of palette coding syntax

|  | Descriptor |
|---|---|
| ```
        xC = x0 + travScan[ scanPos ][ 0 ]
        yC = y0 + travScan[ scanPos ][ 1 ]
        if( scanPos > 0) {
           xcPrev = x0 + travScan[ scanPos − 1 ][ 0 ]
           ycPrev = y0 + travScan[ scanPos − 1 ][ 1 ]
        }
        if( indexMax > 0 && scanPos > = nCbS &&
   palette_run_type_flag[ xcPrev ][ ycPrev ]
           ! = COPY_ABOVE_MODE ) {
           palette_run_type_flag[ xC ][ yC ]
        }
        if( indexMax > 0 ) {
           maxPaletteRun = nCbS * nCbS − scanPos − 1
           if( maxPaletteRun > 0 ) {
              palette_run_msb_id_plus1
              if( scanPos && (1<< palette_run _msb_id_plus1) > MaxPaletteRun )
                 palette_run_to_end_flag
              if( !palette_run_to_end_flag )
                 palette_run_refinement_bits
           }
        } else
           paletteRun = nCbS * nCbS − 1
        scanPos = scanPos + paletteRun + 1
     }
     scanPos = 0
     while( scanPos < nCbS * nCbS ) {
        xC = x0 + travScan[ scanPos ][ 0 ]
        yC = y0 + travScan[ scanPos ][ 1 ]
        if( palette_run_type_flag[ xC ][ yC ] = = COPY_INDEX_MODE &&
           adjustedIndexMax > 0)
           palette_index_idc
        runPos = 0
        scanPosC = scanPos
        while ( runPos < = PaletteRun[travScan[ scanPosC ][ 0 ]][
   travScan[ scanPosC ][ 1 ]] ) {
           xR = x0 + travScan[ ScanPos ][ 0 ]
           yR = y0 + travScan[ ScanPos ][ 1 ]
           if(palette_run_type_flag[ xC ][ yC ] = = COPY_INDEX_MODE ) {
              PaletteSampleMode[ xR ][ yR ] = COPY_INDEX_MODE
              PaletteIndexMap[ xR ][ yR ] = PaletteIndex
           } else {
              PaletteSampleMode[ xR ][ yR ] = COPY_ABOVE_MODE
              PaletteIndexMap[ xR ][ yR ] = PaletteIndexMap[ xR ][ yR − 1 ]
           }
           runPos++
           scanPos++
        }
     }
     scanPos = 0
     while( scanPos < nCbS * nCbS ) {
        xC = x0 + travScan[ scanPos ][ 0 ]
        yC = y0 + travScan[ scanPos ][ 1 ]
        if( PaletteIndexMap[ xC ][ yC ] = =
           IndexMax && palette_escape_val_present_flag ) {
           PaletteSampleMode[ xC ][ yC ] = ESCAPE_MODE
           for( cIdx = 0; cIdx < 3; cIdx++ ) {
              palette_escape_val
              PaletteEscapeVal[ cIdx ][ xR ][ yR ] = palette_escape_val
           }
        }
     . }
   }
``` | ae(v)<br><br><br><br>ae(v)<br>ae(v)<br>ae(v)<br><br><br><br><br><br><br><br><br><br>ae(v)<br><br><br><br><br><br><br><br><br><br><br><br><br><br><br><br><br><br><br>ae(v) |

The syntax elements of palette index coding (e.g., palette_index_idc) and escape colors (e.g., palette_escape_val) may be separately grouped, for example, in the example palette coding syntax of Table 10. In such embodiments, two individual scan loops may be used for the palette indices and escape color values in the current CU.

One or more embodiments may group palette indices and escape colors together (e.g., within the group, palette_index_idc and palette_escape_val are still interleaved) and put them after the palette modes and palette runs, for example.

Both of palette_index_idc and palette_escape_val may be bypass coded. For example, the following syntax element arrangements may be provided: the syntax elements related with palette modes and palette runs (e.g., palette_run_type_flag, palette_run_msb_id_plus1, and/or palette_run_refinement_bits) are placed first in the current CU, and one or more (e.g., all) of the syntax elements (e.g., palette_index_idc and palette_escape_val) are grouped together and placed after the palette modes and palette runs. An example of which is provided in Table 11.

TABLE 11

Example of palette coding syntax

| | Descriptor |
|---|---|
| palette_coding( x0, y0, nCbS ) { <br> ... ... <br>   scanPos = 0 <br>   while( scanPos < nCbS * nCbS ) { <br>     xC = x0 + travScan[ scanPos ][ 0 ] <br>     yC = y0 + travScan[ scanPos ][ 1 ] <br>     if( scanPos > 0) { <br>       xcPrev = x0 + travScan[ scanPos − 1 ][ 0 ] <br>       ycPrev = y0 + travScan[ scanPos − 1 ][ 1 ] <br>     } <br>     if( indexMax > 0 && scanPos > = nCbS && <br> palette_run_type_flag[ xcPrev ][ ycPrev ] <br>       ! = COPY_ABOVE_MODE ) { <br>       palette_run_type_flag[ xC ][ yC ] <br>     } <br>     if( indexMax > 0 ) { <br>       maxPaletteRun = nCbS * nCbS − scanPos − 1 <br>       if( maxPaletteRun > 0 ) { <br>         palette_run_msb_id_plus1 <br>         if( palette_run_msb_id_plus1 > 1 ) <br>           palette_run_refinement_bits <br>       } <br>     } else <br>       paletteRun = nCbS * nCbS − 1 <br>     scanPos = scanPos + paletteRun + 1 <br>   } <br>   scanPos = 0 <br>   while( scanPos < nCbS * nCbS ) { <br>     xC = x0 + travScan[ scanPos ][ 0 ] <br>     yC = y0 + travScan[ scanPos ][ 1 ] <br>     if( palette_run_type_flag[ xC ][ yC ] = = COPY_INDEX_MODE && <br>       adjustedIndexMax > 0) <br>       palette_index_idc <br>     runPos = 0 <br>     scanPosC = scanPos <br>     while ( runPos < = paletteRun[travScan[ scanPosC ][ 0 ]][ <br> travScan[ scanPosC ][ 1 ]] ) { <br>       xR = x0 + travScan[ scanPos ][ 0 ] <br>       yR = y0 + travScan[ scanPos ][ 1 ] <br>       if( paletteIndex = = palette_size ) { <br>         for( cIdx = 0; cIdx < 3; cIdx++ ) { <br>           palette_escape_val <br>           paletteEscapeVal[ cIdx ][ xC ][ yC ] = palette_escape_val <br>         } <br>       } <br>       runPos++ <br>       scanPos++ <br>     } <br>   } <br> } | <br><br><br><br><br><br><br><br><br><br><br><br>ae(v)<br><br><br><br>ae(v)<br><br>ae(v)<br><br><br><br><br><br><br><br><br><br><br><br><br><br><br>ae(v)<br><br><br><br><br><br><br><br>ae(v) |

A second run coding method may be used. For example, Table 12 is an example of a palette syntax table with the arrangement described above with the second run coding (e.g., run-to-end syntax elements) included.

TABLE 12

Example of palette coding syntax

| | Descriptor |
|---|---|
| palette_coding( x0, y0, nCbS ) { <br> ... ... <br>   scanPos = 0 <br>   while( scanPos < nCbS * nCbS ) { <br>     xC = x0 + travScan[ scanPos ][ 0 ] <br>     yC = y0 + travScan[ scanPos ][ 1 ] <br>     if( scanPos > 0) { <br>       xcPrev = x0 + travScan[ scanPos − 1 ][ 0 ] <br>       ycPrev = y0 + travScan[ scanPos − 1 ][ 1 ] <br>     } <br>     if( indexMax > 0 && scanPos > = nCbS && <br> palette_run_type_flag[ xcPrev ][ ycPrev ] <br>       ! = COPY_ABOVE_MODE ) { | |

TABLE 12-continued

Example of palette coding syntax

| | Descriptor |
|---|---|
|       palette_run_type_flag[ xC ][ yC ] | ae(v) |
|     } | |
|     if( indexMax > 0 ) { | |
|       maxPaletteRun = nCbS * nCbS − scanPos − 1 | |
|       if( maxPaletteRun > 0 ) { | |
|         palette_run_msb_id_plus1 | ae(v) |
|           if( scanPos && (1<< palette_run _msb_id_plus1) > MaxPaletteRun ) | |
|             palette_run_to_end_flag | ae(v) |
|           if( !palette_run_to_end_flag ) | |
|             palette_run_refinement_bits | ae(v) |
|       } | |
|     } else | |
|       paletteRun = nCbS * nCbS − 1 | |
|     scanPos = scanPos + paletteRun + 1 | |
| } | |
| scanPos = 0 | |
| while( scanPos < nCbS * nCbS ) { | |
|   xC = x0 + travScan[ scanPos ][ 0 ] | |
|   yC = y0 + travScan[ scanPos ][ 1 ] | |
|   if( palette_run_type_flag[ xC ][ yC ] = = COPY_INDEX_MODE && | |
|     adjustedIndexMax > 0) | |
|     palette_index_idc | ae(v) |
|   runPos = 0 | |
|   scanPosC = scanPos | |
|   while ( runPos < = paletteRun[travScan[ scanPosC ][ 0 ]][ travScan[ scanPosC ][ 1 ]] ) { | |
|     xR = x0 + travScan[ scanPos ][ 0 ] | |
|     yR = y0 + travScan[ scanPos ][ 1 ] | |
|     if( paletteIndex = = palette_size ) { | |
|       for( cIdx = 0; cIdx < 3; cIdx++ ) { | |
|         palette_escape_val | ae(v) |
|         paletteEscapeVal[ cIdx ][ xC ][ yC ] = palette_escape_val | |
|       } | |
|     } | |
|     runPos++ | |
|     scanPos++ | |
|   } | |
| } | |
| } | |

If the palette indices are grouped at front before palette mode, palette run, and escape color, and the extended copy above mode is enabled, the maximum value for palette index coding in TBC may not be determined for those palette indices whose above neighboring pixel refers to the pixels of the neighboring CU. The index at the above neighboring position may not be available. When the coded value is equal to the maximum value (e.g., index_max) minus 1, then an additional flag may be signaled to indicate whether the coded value should be interpreted as the maximum value minus one, or interpreted as the maximum value.

One or more embodiments may be provided where palette indices are grouped (e.g., arranged) at the front and extended copy above mode is enabled. A CU level indication (e.g., flag) may be provided. For example, the CU-level indication may be arranged up front to instruct the decoder how to interpret and/or to entropy decode the palette indices.

A syntax element use_index_max_for_palette_indices may be sent as a CU level flag, for example, as illustrated in Table 13. If the use_index_max_for_palette_indices flag has the value 1, then the coding of palette indices may use the maximum value for TBC equal to the palette table size if there is no escape color, or the coding of palette indices may use the maximum value for TBC equal to the palette table size plus 1 if there is an escape color. If use_index_max_for_palette_indices flag has the value 0, then the coding of palette indices may use the maximum value for TBC equal to the palette table size minus 1 if there is no escape color, or the coding of palette indices may use the maximum value for TBC equal to the palette table size if there is an escape color. The decoder may determine the maximum value for TBC and decode the palette indices accordingly.

TABLE 13

Example of palette syntax

| | Descriptor |
|---|---|
| palette_coding( x0, y0, nCbS ) { | |
|   ... | |
|   use_index_max_for_palette_indices | ae(v) |
|   if( indexMax > 0) { | |
|     palette_transpose_flag | ae(v) |
|     palette_num_indices | ae(v) |

TABLE 13-continued

Example of palette syntax

| | Descriptor |
|---|---|
|     for( i = 0; i < palette_num_indices; i++ )<br>        palette_index_idc<br>    last_palette_run_type_flag | ae(v) |
|     indicesLeft = palette_num_indices | ae(v) |
| }<br>scanPos = 0<br>while( scanPos < nCbS * nCbS ) {<br>    ...<br>    if( indexMax > 0 && scanPos > = nCbS &&<br>palette_run_type_flag[ xcPrev ][ ycPrev ]<br>    ! = COPY_ABOVE_MODE && indicesLeft && scanPos < nCbS * nCbS<br>− 1){<br>        palette_run_type_flag[ xC ][ yC ] | ae(v) |
|     }<br>    indicesLeft −= 1<br>    if( indexMax > 0 && (indicesLeft \| \| palette_run_type_flag !=<br>last_palette_run_type_flag)) {<br>        maxPaletteRun = nCbS * nCbS − scanPos − 1<br>        ...<br>    }<br>} | |

The syntax element use_index_max_for_palette indices may indicate whether index_max is used as the maximum value for TBC encoding of the palette indices. The syntax element use_index_max_for_palette_indices having a value of 1 may indicate that the coding of palette indices uses the maximum value for TBC equal to palette table size if there is no escape color, or that the coding of palette indices uses the maximum value for TBC equal to the palette table size plus 1 if there is an escape color. The syntax element use_index_max_for_palette_indices having a value of 0 may indicate that the coding of palette indices uses the maximum value for TBC equal to palette table size minus 1 if there is no escape color, or that the coding of palette indices uses the maximum value for TBC equal to the palette table size if there is escape color.

The syntax element use_index_max_for_palette_indices may be used as a CU level flag, for example, as illustrated in Table 14. If the syntax element use_index_max_for_palette_indices has the value 1, then the number of leading palette indices may be encoded using the maximum value for TBC equal to palette table size if there is no escape color, or the number of leading palette indices may be encoded using the maximum value for TBC equal to the palette table size plus 1 if there is escape color. A remaining number of palette indices may be encoded using the maximum value for TBC equal to palette table size minus 1 if there is no escape color, or equal to the palette table size if there is an escape color. The number of leading palette indices may be sent to the decoder as the value palette_num_leading_indices. The number of remaining palette indices may be sent to the decoder as the value palette_num_remaining_indices. The value of palette_num_leading_indices may be sent conditionally, for example, the value of palette_num_leading_indices may be sent in the bitstream only in the case where use_index_max_for_palette_indices has the value 1.

If the syntax element use_index_max_for_palette_indices has the value of 0, then the value of palette_num_leading_indices may not be present in the bitstream, and may be inferred to have a value of zero. In this case, one or more (e.g., all) of palette indices may be encoded using the maximum value for TBC equal to palette table size minus 1 if there is no escape color, or one or more (e.g., all) of palette indices may be encoded using the maximum value for TBC equal to the palette table size if there is escape color. The decoder may use these syntax elements to determine the maximum value for TBC for one or more (e.g., each) palette index, and may decode the palette indices accordingly.

TABLE 14

Example of palette syntax

| | Descriptor |
|---|---|
| palette_coding( x0, y0, nCbS ) {<br>    ...<br>    use_index_max_for_palette_indices | ae(v) |
|     if( indexMax > 0) {<br>        palette_transpose_flag | ae(v) |
|         if (use_index_max_for_palette_indices)<br>            palette_num_leading_indices | ae(v) |
|         palette_num_remaining_indices | ae(v) |
|         for( i = 0; i < palette_num_leading_indices +<br>palette_num_remaining_indices; i++ )<br>            palette_index_idc<br>        last_palette_run_type_flag | ae(v) |
|         indicesLeft = palette_num_indices | ae(v) |
|     }<br>    scanPos = 0 | |

TABLE 14-continued

Example of palette syntax

| | Descriptor |
|---|---|
| while( scanPos < nCbS * nCbS ) { | |
| ... | |
|    if( indexMax > 0 && scanPos > = nCbS && palette_run_type_flag[ xcPrev ][ ycPrev ] | |
|     != COPY_ABOVE_MODE && indicesLeft && scanPos < nCbS * nCbS − 1) { | |
|      palette_run_type_flag[ xC ] [ yC ] | ae(v) |
|    } | |
|    indicesLeft −= 1 | |
|    if( indexMax > 0 && (indicesLeft \|\| palette_run_type_flag != last_palette_run_type_flag)) { | |
|     maxPaletteRun = nCbS * nCbS − scanPos − 1 | |
|     ... | |
|    } | |
| } | |
| } | |

The syntax element use_index_max_for_palette_indices may indicate whether a nonzero value of palette_num_leading_indices is signaled in the bitstream. The syntax element palette_num leading_indices may indicate the number of leading palette indices which are coded with a maximum value for TBC coding set to the palette table size if there is no escape color coding in the current CU, or set to the palette table size plus 1 if there is escape color coding in the current CU. If not present, the value of palette_num_leading_indices may be inferred to be zero. The syntax element palette_num_remaining_indices may indicate the number of palette indices which are coded with a maximum value for TBC coding set to the palette table size minus 1 if there is no escape color coding in the current CU, or set to the palette table size if there is escape color coding in the current CU.

A palette syntax may be provided where use_index_max_for_palette_indices is not signaled and/or palette_num_leading_indices is present (e.g., always present), for example, as illustrated in Table 15.

TABLE 15

Example of palette syntax

| | Descriptor |
|---|---|
| palette_coding( x0, y0, nCbS ) { | |
|   ... | |
|   if( indexMax > 0) { | |
|     palette_transpose_flag | ae(v) |
|     palette_num_leading_indices | ae(v) |
|     palette_num_remaining_indices | ae(v) |
|     for( i = 0; i < palette_num_leading_indices + palette_num_remaining_indices; i++ ) | |
|       palette_index_idc | |
|     last_palette_run_type_flag | ae(v) |
|     indicesLeft = palette_num_indices | ae(v) |
|   } | |
|   scanPos = 0 | |
|   while( scanPos < nCbS * nCbS ) { | |
|     ... | |
|     if( indexMax > 0 && scanPos > = nCbS && palette_run_type_flag[ xcPrev ][ ycPrev ] | |
|      != COPY_ABOVE_MODE && indicesLeft && scanPos < nCbS * nCbS − 1) { | |
|       palette_run_type_flag[ xC ][ yC ] | ae(v) |
|     } | |
|     indicesLeft −= 1 | |
|     if( indexMax > 0 && (indicesLeft \|\| palette_run_type_flag != last_palette_run_type_flag)) { | |
|       maxPaletteRun = nCbS * nCbS − scanPos − 1 | |
|       ... | |
|     } | |
|   } | |
| } | |

The signaling of palette_index_refinement_flag may be moved from the parsing loop of palette mode and palette run to the parsing loop of palette indices. The maximum TBC level may be reduced by one (e.g., pMax−1) before parsing the palette indices of one palette-coded CU. The palette_index_refinement_flag may be signaled (e.g., always signaled) when the parsed palette index of one pixel is equal to pMax−1. Such syntax may comprise a higher parsing throughput, for example, since the bypass bins of palette index coding may be separated from the context-coded bins of palette modes and palette runs. An example of this syntax is provided in Table 16.

TABLE 16

Example of palette syntax

| | Descriptor |
|---|---|
| palette_coding( x0, y0, nCbS ) { | |
|   palettePredictionFinished = 0 | |
|   paletteNumPredictedEntries = 0 | |
|   for( i = 0; i < PredictorPaletteSize && !palettePredictionFinished && | |
|     paletteNumPredictedEntries < palette_max_size; i++ ) { | |
|     palette_predictor_run | ae(v) |
|     if( palette_predictor_run != 1 ) | |
|       if( palette_predictor_run > 1 ) | |
|         i += palette_predictor_run − 1 | |
|       PalettePredictorEntryReuseFlag[ i ] = 1 | |
|       paletteNumPredictedEntries ++ | |
|     } else | |
|       palettePredictionFinished = 1 | |
|   } | |
|   if( paletteNumPredictedEntries < palette_max_size ) | |
|     palette_num_signalled_entries | ae(v) |
|   for( cIdx = 0; cIdx < 3; cIdx++ ) | |
|     for( i = 0; i < palette_num_signalled_ entries; i++ ) | |
|       palette_entry | ae(v) |
|   } | |
|   if( currentPaletteSize != 0) | |
|     palette_escape_val_present_flag | ae(v) |
|   if( palette_escape_val_present_flag ) { | |
|     if( cu_qp_delta_enabled_flag && !IsCuQpDeltaCoded ) { | |
|       cu_qp_delta_palette_abs | ae(v) |
|       if( cu_qp_delta_palette_abs ) | |
|         cu_qp_delta_palette_sign_flag | ae(v) |
|     } | |
|     if( cu_chroma_qp_offset_enabled_flag && !IsCuChromaQpOffsetCoded ) { | |
|       cu_chroma_qp_palette_offset_flag | ae(v) |
|       if( cu_chroma_qp_offset_flag && chroma_qp_offset_list_len_minus1 > 0 ) | |
|         cu_chroma_qp_palette_offset_idx | ae(v) |
|     } | |
|   } | |
|   if( indexMax > 0 ) { | |
|     palette_transpose_flag | ae(v) |
|     palette_num_indices | ae(v) |
|     for( i = 0; i < palette_num_indices; i++ ) { | |
|       palette_index_idc | ae(v) |
|       if (palette_index_idc = = (indexMax − 1) ) | |
|         palette_index_refinement_flag | ae(v) |
|     } | |
|     last_palette_run_type_flag | ae(v) |
|     NumIndicesLeft = palette_num_indices | |
|   } | |
|   scanPos = 0 | |
|   while( scanPos < nCbS * nCbS ) { | |
|     xC = x0 + travScan[ scanPos ][ 0 ] | |
|     yC = y0 + travScan[ scanPos ][ 1 ] | |
|     if( scanPos > 0) { | |
|       xcPrev = x0 + travScan[ scanPos − 1 ][ 0 ] | |
|       ycPrev = y0 + travScan[ scanPos − 1 ][ 1 ] | |
|     } | |
|     if( indexMax > 0 && (scanPos = = 0 \|\| | |
|       ( palette_run_type_flag[ xcPrev ][ ycPrev ] ! = COPY_ABOVE_MODE && | |
|       NumIndicesLeft && scanPos < nCbS * nCbS − 1 ) ) ) { | |
|       palette_run_type_flag[ xC ][ yC ] | ae(v) |
|     } | |
|     if( palette_run_type_flag[ xC ][ yC ] = = COPY_INDEX_MODE && | |
|       indexMax > 1) { | |
|       NumIndicesLeft −= 1 | |
|     } | |
|     if( indexMax > 0 && (NumIndicesLeft \|\| palette_run_type_flag != | |
|       last_palette_run_type_flag) ) { | |
|       maxPaletteRun = nCbS * nCbS − scanPos − 1 | |

TABLE 16-continued

Example of palette syntax

| | Descriptor |
|---|---|
|     if( maxPaletteRun > 0 ) { | |
|       palette_run_msb_id_plus1 | ae(v) |
|       if( palette_run_msb_id_plus1 > 1 ) | |
|         palette_run_refinement_bits | ae(v) |
|     } | |
|   } else | |
|     paletteRun = nCbS * nCbS - 1 - scanPos | |
|   runPos = 0 | |
|   while ( runPos < = paletteRun ) { | |
|     xR = x0 + travScan[ scanPos ][ 0 ] | |
|     yR = y0 + travScan[ scanPos ][ 1 ] | |
|     if( palette_run_type_flag[ xC ][ yC ] = = COPY_INDEX_MODE && | |
|       paletteIndex = = indexMax ) { | |
|       PaletteSampleMode[ xR ][ yR ] = ESCAPE_MODE | |
|       PaletteIndexMap[ xR ][ yR ] = paletteIndex | |
|       for( cIdx = 0; cIdx < 3; cIdx++ ) { | |
|         palette_escape_val | ae(v) |
|         PaletteEscapeVal[ cIdx ][ xR ][ yR ] = palette_escape_val | |
|       } | |
|     } else if(palette_run_type_flag[ xC ][ yC ] = = COPY_INDEX_MODE | |
| ) { | |
|       PaletteSampleMode[ xR ][ yR ] = COPY_INDEX_MODE | |
|       PaletteIndexMap[ xR ][ yR ] = paletteIndex | |
|     } else { | |
|       PaletteSampleMode[ xR ][ yR ] = COPY_ABOVE_MODE | |
|       PaletteIndexMap[ xR ][ yR ] = (yR - 1) < y0 ? | |
|         (bNeighbour ? NCP_INDEX :0) :PaletteIndexMap[ xR ][ yR - 1 ] | |
|     } | |
|     runPos++ | |
|     scanPos++ | |
|   } | |
| } | |
| } | |

Figure 14A:
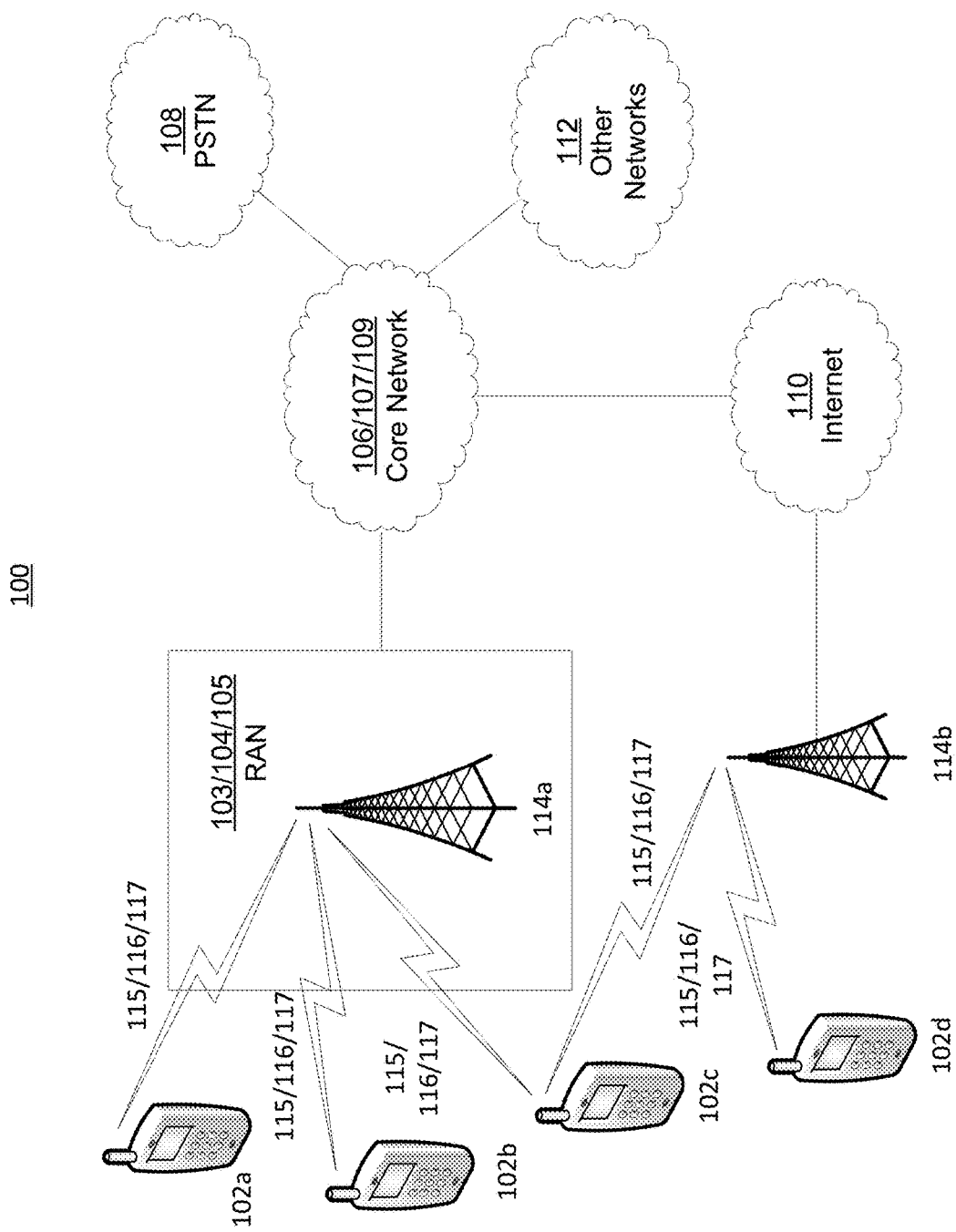
FIG. 14A is a system diagram of an example communications system in which one or more disclosed embodiments may be implemented.

FIG. 14A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 14A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 14A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 14A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 14A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 14A may be configured to communicate with the base station 114a, which may employ a cellular-based radio technology, and with the base station 114b, which may employ an IEEE 802 radio technology.

Figure 14B:
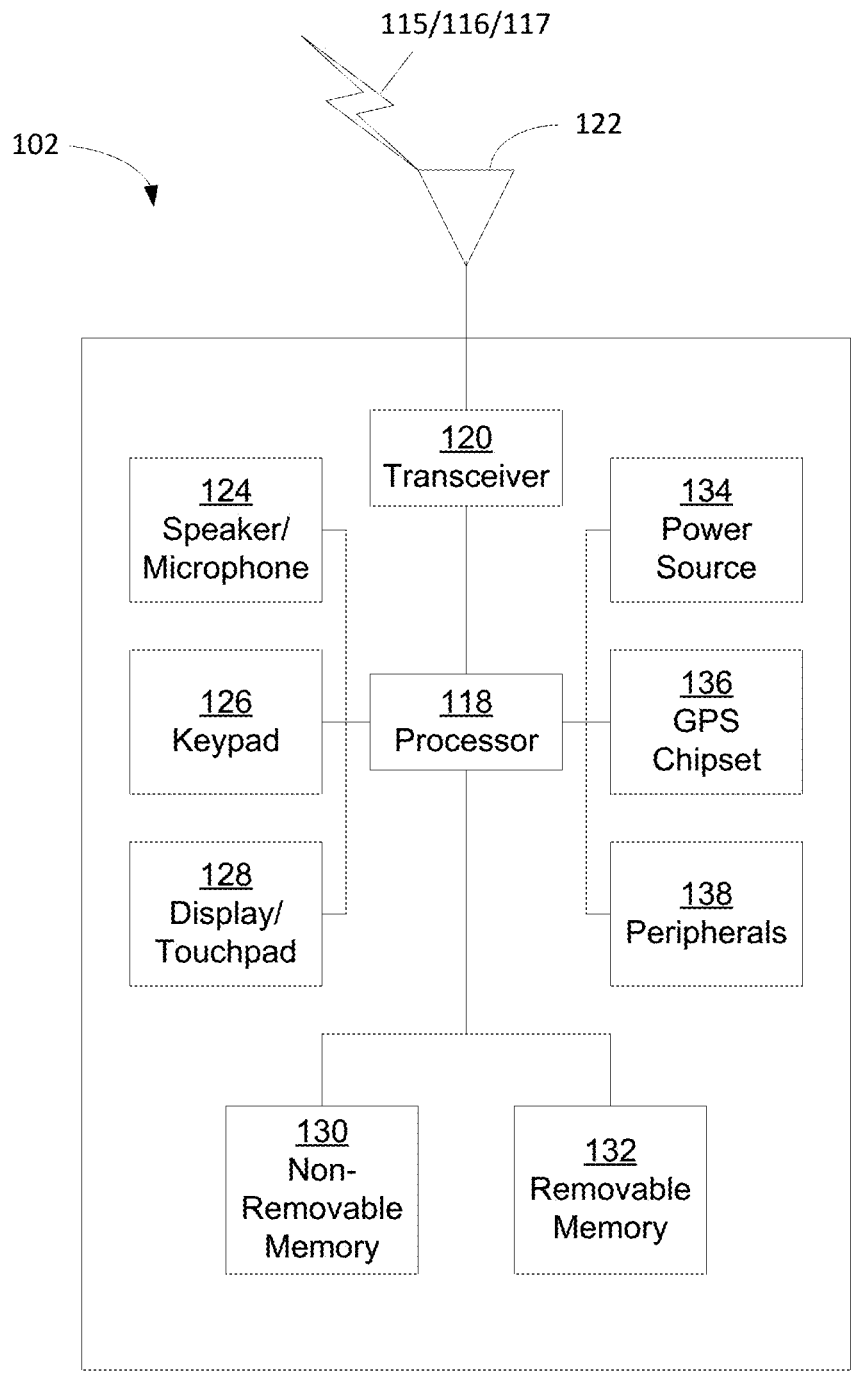
FIG. 14B is a system diagram of an example wireless transmit/receive unit (WTRU) that may be used within the communications system illustrated in FIG. 14A.

FIG. 14B is a system diagram of an example WTRU 102. As shown in FIG. 14B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 14B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 14B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/

117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 14B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14C:
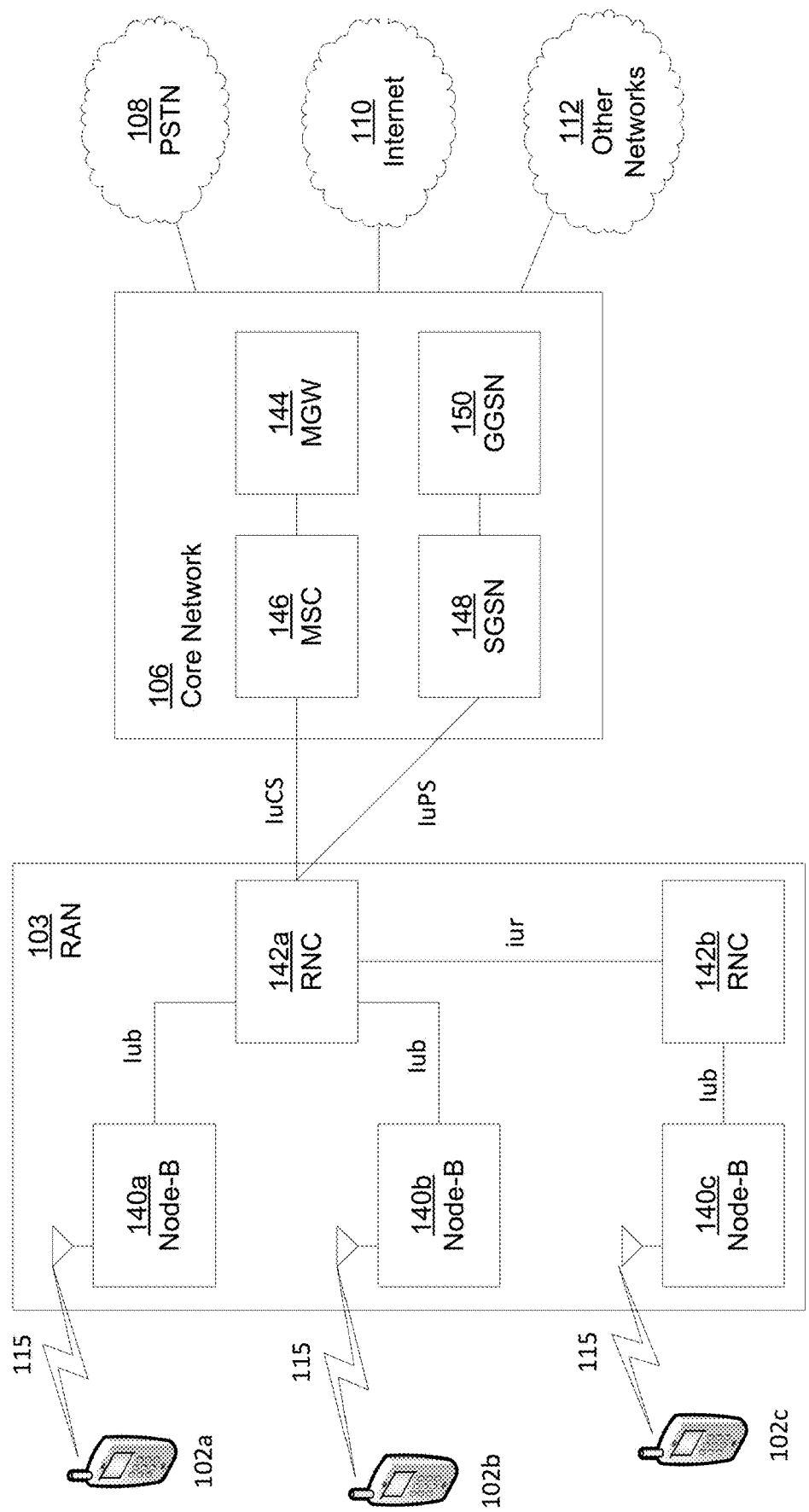
FIG. 14C is a system diagram of an example radio access network and an example core network that may be used within the communications system illustrated in FIG. 14A.

FIG. 14C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 14C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 14C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 14C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 14D:
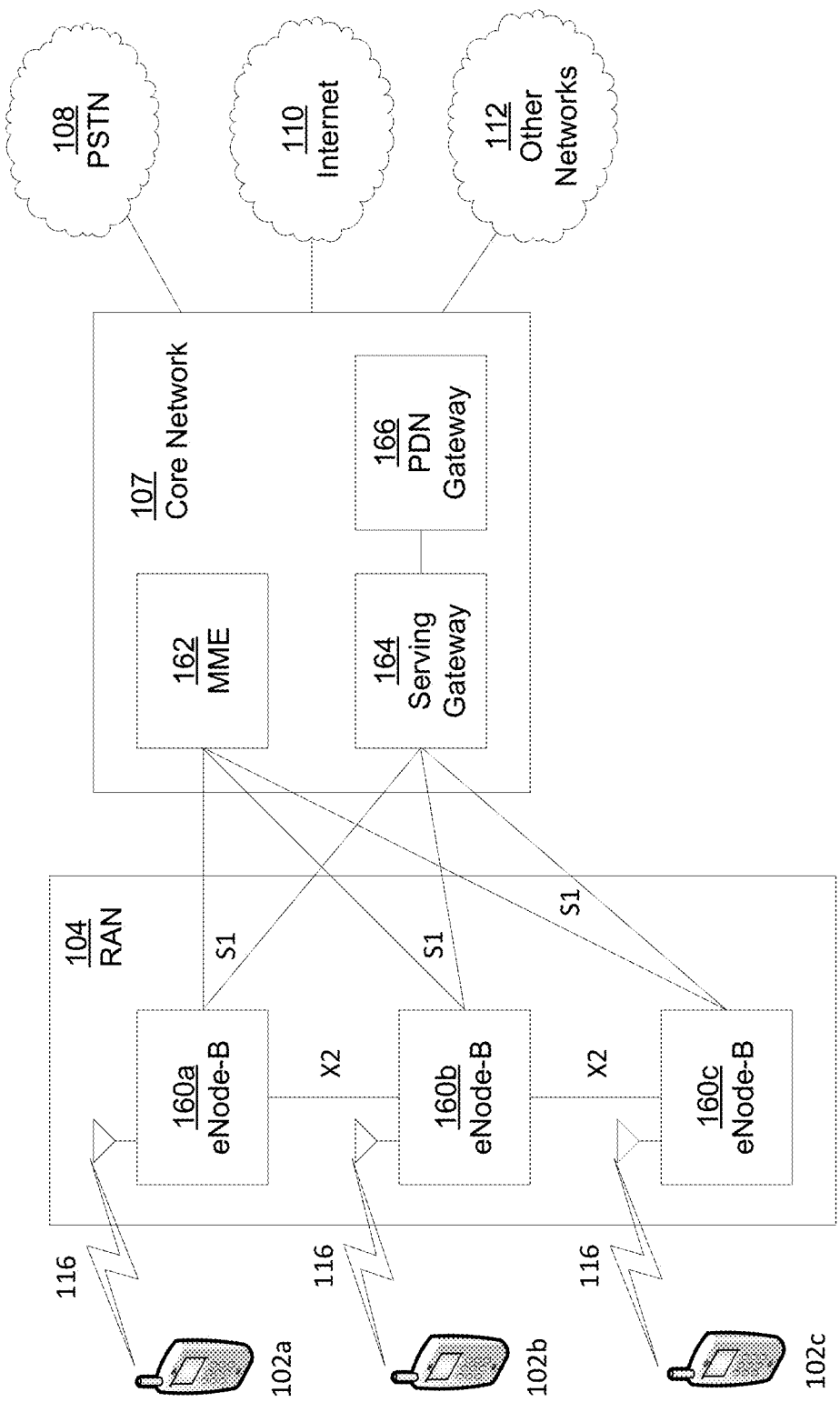
FIG. 14D is a system diagram of another example radio access network and an example core network that may be used within the communications system illustrated in FIG. 14A.

FIG. 14D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 14D, the eNode-Bs 160a, 160b, 160c may communicate with one another over an X2 interface.

The core network 107 shown in FIG. 14D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 14E:
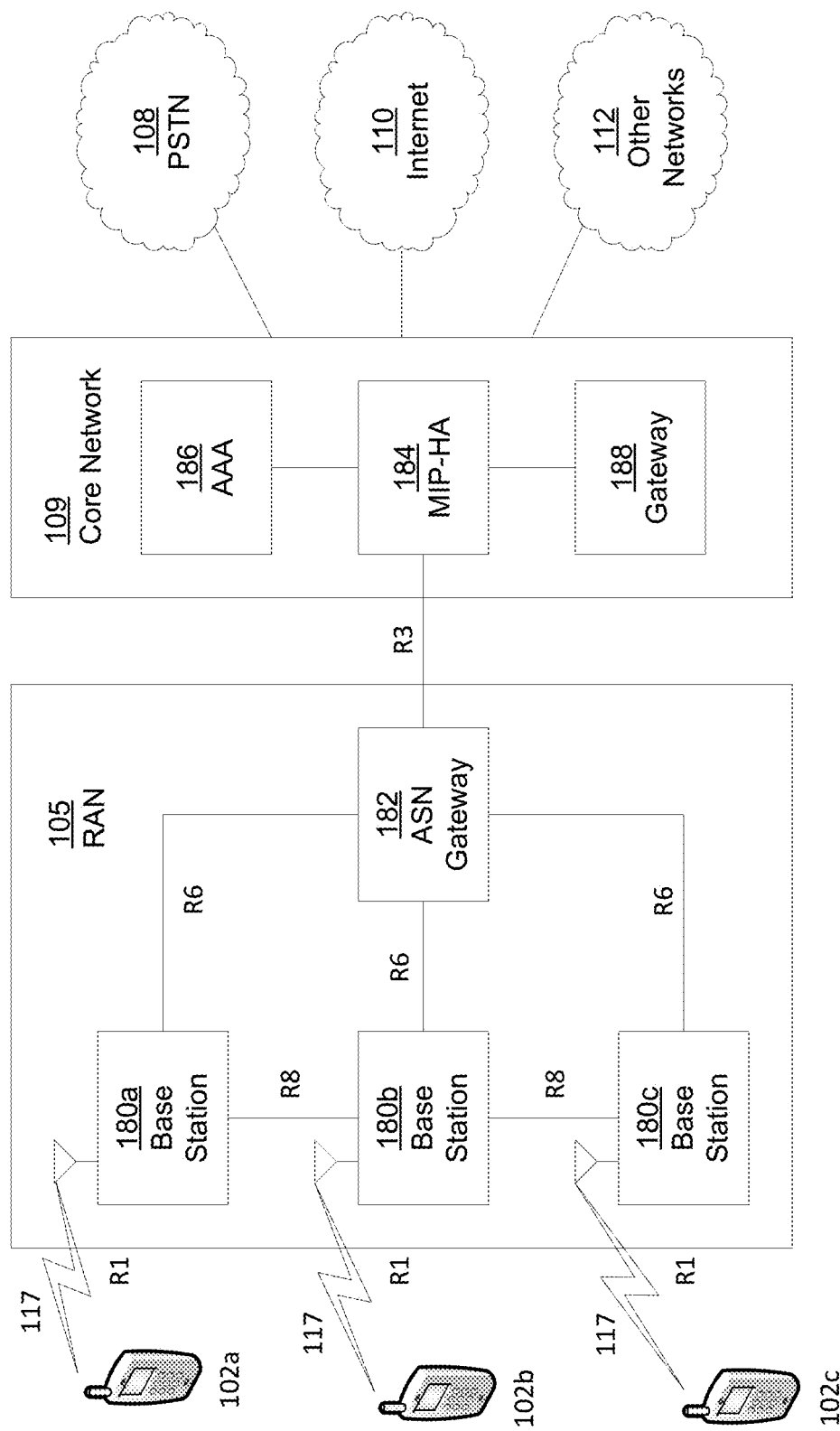
FIG. 14E is a system diagram of another example radio access network and an example core network that may be used within the communications system illustrated in FIG. 14A.

FIG. 14E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 14E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 14E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 14E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for palette decoding, the method comprising:
receiving a first scan direction indication for a first coding unit (CU) in video data, wherein the first scan direction indication is coded with a single context that does not depend on a value of a second scan direction indication for a second CU, wherein the first scan direction indication indicates a scan direction for palette coding; and
parsing the first CU based on the first scan direction indication.

2. The method of claim 1, wherein the first scan direction indication for the first CU is a scan direction flag.

3. The method of claim 1, wherein the second CU is a neighboring CU of the first CU, and the second scan direction indication indicates a scan direction for the neighboring CU.

4. The method of claim 1, wherein the first scan direction indication for the first CU is a palette_transpose_flag.

5. A device for palette decoding, the device comprising:
a processor configured to:
receive a first scan direction indication for a first coding unit (CU) in video data, wherein the first scan direction indication is coded with a single context that does not depend on a value of a second scan direction indication for a second CU, wherein the first scan direction indication indicates a scan direction for palette coding; and
parse the first CU based on the first scan direction indication.

6. The device of claim 5, wherein the first scan direction indication for the first CU is a scan direction flag.

7. The device of claim 5, wherein the second CU is a neighboring CU of the first CU, and the second scan direction indication indicates a scan direction for the neighboring CU.

8. The device of claim 5, wherein the first scan direction indication for the first CU is a palette_transpose_flag.

9. A method for palette encoding, the method comprising:
determining a first coding unit (CU) of video data; and
including a first scan direction indication for the first CU in the video data, wherein the first scan direction indication is coded with a single context that does not depend on a value of a second scan direction indication for a second CU, wherein the first scan direction indication indicates a scan direction for palette coding.

10. The method of claim 9, wherein the first scan direction indication of the palette mode for the first CU is a scan direction flag.

11. The method of claim 9, wherein the second CU is a neighboring CU of the first CU, and the second scan direction indication indicates a scan direction for the neighboring CU.

12. The method of claim 9, wherein the first scan direction indication for the first CU is a palette_transpose_flag.

13. A device for palette encoding, the device comprising:
a processor, the processor configured to:
determine a first coding unit (CU) of video data; and
include a first scan direction indication for the first CU in the video data, wherein the first scan direction indication is coded with a single context that does not depend on a value of a second scan direction indication for a second CU, wherein the first scan direction indication indicates a scan direction for palette coding.

14. The device of claim 13, wherein the first scan direction indication of the palette mode for the first CU is a scan direction flag.

15. The device of claim 13, wherein the second CU is a neighboring CU of the first CU, and the second scan direction indication indicates a scan direction for the neighboring CU.

16. The device of claim 13, wherein the first scan direction indication for the first CU is a palette_transpose_flag.

17. The method of claim 1, further comprising:
determining that an escape color presence flag for the first CU is not signaled in video data;

inferring that a value of the escape color presence flag for the first CU is equal to a value that indicates that the first CU contains at least one escape color coded sample, wherein the value of the escape color presence flag for the first CU is inferred based on the escape color presence flag for the first CU not being signaled in the video data; and parsing the first CU based on the value of the escape color presence flag.

18. The device of claim 5, wherein the processor is further configured to:

determine that an escape color presence flag for the first CU is not signaled in video data;

infer that a value of the escape color presence flag for the first CU is equal to a value that indicates that the first CU contains at least one escape color coded sample, wherein the value of the escape color presence flag for the first CU is inferred based on the escape color presence flag for the first CU not being signaled in the video data; and parse the first CU based on the value of the escape color presence flag.

19. The method of claim 9, further comprising:

determining the first CU that contains an escape color coded sample;

determining that a value of an escape color presence flag for the first CU indicates that the first CU contains the escape color coded sample;

determining that the value of the escape color presence flag for the first CU can be inferred by a decoder when the escape color presence flag for the first CU is not signaled in video data; and preventing the escape color presence flag for the first CU from being signaled in the video data.

20. The device of claim 13, wherein the processor is further configured to:

determine the first CU that contains an escape color coded sample;

determine that a value of an escape color presence flag for the first CU indicates that the first CU contains the escape color coded sample;

determine that the value of the escape color presence flag for the first CU can be inferred by a decoder when the escape color presence flag for the first CU is not signaled in video data; and prevent the escape color presence flag for the first CU from being signaled in the video data.

21. A non-transitory computer readable medium comprising instructions for implementing, when executed by at least one processor, steps comprising:

receiving a first scan direction indication for a first coding unit (CU) in video data, wherein the first scan direction indication is coded with a single context that does not depend on a value of a second scan direction indication for a second CU, wherein the first scan direction indication indicates a scan direction for palette coding; and parsing the first CU based on the first scan direction indication.

22. A non-transitory computer readable medium comprising instructions for implementing, when executed by a processor, steps comprising:

determining a first coding unit (CU) of video data; and including a first scan direction indication for the first CU in the video data, wherein the first scan direction indication is coded with a single context that does not depend on a value of a second scan direction indication for a second CU, wherein the first scan direction indication indicates a scan direction for palette coding.

* * * * *